United States Patent
Goulakov

(10) Patent No.: US 9,659,589 B2
(45) Date of Patent: May 23, 2017

(54) FREE-STANDING REFLECTOR USABLE IN HEAT ASSISTED MAGNETIC RECORDING TECHNOLOGY

(71) Applicant: Western Digital (Fremont), LLC, Fremont, CA (US)

(72) Inventor: Arkadi B. Goulakov, Fremont, CA (US)

(73) Assignee: Western Digital (Fremont), LLC, Fremont, CA (US)

(*) Notice: Subject to any disclaimer, the term of this patent is extended or adjusted under 35 U.S.C. 154(b) by 0 days.

(21) Appl. No.: 14/869,606

(22) Filed: Sep. 29, 2015

(65) Prior Publication Data

US 2017/0092309 A1 Mar. 30, 2017

(51) Int. Cl.
*G11B 5/31* (2006.01)
*G11B 5/48* (2006.01)
*G11B 5/00* (2006.01)

(52) U.S. Cl.
CPC ............ *G11B 5/4866* (2013.01); *G11B 5/314* (2013.01); *G11B 5/3133* (2013.01); *G11B 5/3169* (2013.01); *G11B 2005/0021* (2013.01)

(58) Field of Classification Search
CPC .................. G11B 5/3133; G11B 5/314; G11B 2005/0021
USPC ..................................................... 360/125.31
See application file for complete search history.

(56) References Cited

U.S. PATENT DOCUMENTS

| | | | |
|---|---|---|---|
| 6,075,673 A | 6/2000 | Wilde et al. |
| 6,097,575 A | 8/2000 | Trang et al. |
| 6,125,014 A | 9/2000 | Riedlin, Jr. |
| 6,125,015 A | 9/2000 | Carlson et al. |
| 6,130,863 A | 10/2000 | Wang et al. |
| 6,137,656 A | 10/2000 | Levi et al. |
| 6,144,528 A | 11/2000 | Anaya-Dufresne et al. |
| 6,147,838 A | 11/2000 | Chang et al. |
| 6,151,196 A | 11/2000 | Carlson et al. |
| 6,178,064 B1 | 1/2001 | Chang et al. |
| 6,181,522 B1 | 1/2001 | Carlson |
| 6,181,673 B1 | 1/2001 | Wilde et al. |
| 6,229,672 B1 | 5/2001 | Lee et al. |
| 6,236,543 B1 | 5/2001 | Han et al. |
| 6,246,547 B1 | 6/2001 | Bozorgi et al. |
| 6,249,404 B1 | 6/2001 | Doundakov et al. |
| 6,330,131 B1 | 12/2001 | Nepela et al. |
| 6,339,518 B1 | 1/2002 | Chang et al. |
| 6,349,017 B1 | 2/2002 | Schott |
| 6,373,660 B1 | 4/2002 | Lam et al. |
| 6,378,195 B1 | 4/2002 | Carlson |
| 6,522,504 B1 | 2/2003 | Casey |
| 6,538,850 B1 | 3/2003 | Hadian et al. |
| 6,583,953 B1 | 6/2003 | Han et al. |

(Continued)

*Primary Examiner* — Jefferson Evans
(74) *Attorney, Agent, or Firm* — Foley & Lardner LLP

(57) ABSTRACT

A heat assisted magnetic recording (HAMR) write apparatus is described. The HAMR write apparatus is coupled with a laser that provides energy. The HAMR writer has a media-facing surface (MFS) and a laser-facing surface. The HAMR write apparatus includes a free-standing reflector and at least one waveguide. The free-standing reflector resides on the laser-facing surface and has a concave reflective surface oriented to receive the energy from the laser. The waveguide (s) are optically coupled with the free-standing reflector and direct energy from the laser toward the MFS.

18 Claims, 15 Drawing Sheets

(56) References Cited

U.S. PATENT DOCUMENTS

| | | | |
|---|---|---|---|
| 6,646,832 B2 | 11/2003 | Anaya-Dufresne et al. |
| 6,661,612 B1 | 12/2003 | Peng |
| 6,665,146 B2 | 12/2003 | Hawwa et al. |
| 6,690,545 B1 | 2/2004 | Chang et al. |
| 6,704,173 B1 | 3/2004 | Lam et al. |
| 6,708,389 B1 | 3/2004 | Carlson et al. |
| 6,717,773 B2 | 4/2004 | Hawwa et al. |
| 6,721,142 B1 | 4/2004 | Meyer et al. |
| 6,744,599 B1 | 6/2004 | Peng et al. |
| 6,771,468 B1 | 8/2004 | Levi et al. |
| 6,796,018 B1 | 9/2004 | Thornton |
| 6,801,402 B1 | 10/2004 | Subrahmanyam et al. |
| 6,856,489 B2 | 2/2005 | Hawwa et al. |
| 6,873,496 B1 | 3/2005 | Sun et al. |
| 6,912,103 B1 | 6/2005 | Peng et al. |
| 6,937,439 B1 | 8/2005 | Chang et al. |
| 6,956,718 B1 | 10/2005 | Kulkarni et al. |
| 6,972,930 B1 | 12/2005 | Tang et al. |
| 7,006,330 B1 | 2/2006 | Subrahmanyam et al. |
| 7,006,331 B1 | 2/2006 | Subrahmanyam et al. |
| 7,010,847 B1 | 3/2006 | Hadian et al. |
| 7,019,945 B1 | 3/2006 | Peng et al. |
| 7,027,264 B1 | 4/2006 | Subrahmanyam et al. |
| 7,085,104 B1 | 8/2006 | Hadian et al. |
| 7,099,117 B1 | 8/2006 | Subrahmanyam et al. |
| 7,174,622 B2 | 2/2007 | Meyer et al. |
| 7,289,299 B1 | 10/2007 | Sun et al. |
| 7,306,344 B2 | 12/2007 | Abu-Ageel |
| 7,307,816 B1 | 12/2007 | Thornton et al. |
| 7,315,435 B1 | 1/2008 | Pan |
| 7,315,436 B1 | 1/2008 | Sanchez |
| 7,393,477 B2 | 7/2008 | Liao |
| 7,414,814 B1 | 8/2008 | Pan |
| 7,436,631 B1 | 10/2008 | Fanslau, Jr. et al. |
| 7,474,508 B1 | 1/2009 | Li et al. |
| 7,477,486 B1 | 1/2009 | Sun et al. |
| 7,593,190 B1 | 9/2009 | Thornton et al. |
| 7,595,963 B1 | 9/2009 | Chen et al. |
| 7,616,405 B2 | 11/2009 | Hu et al. |
| 7,729,089 B1 | 6/2010 | Hogan |
| 7,949,218 B2* | 5/2011 | Gage ................. G11B 5/314 |
| | | | 359/34 |
| 7,995,310 B1 | 8/2011 | Pan |
| 8,081,400 B1 | 12/2011 | Hu |
| 8,087,973 B1 | 1/2012 | Sladek et al. |
| 8,089,730 B1 | 1/2012 | Pan et al. |
| 8,164,858 B1 | 4/2012 | Moravec et al. |
| 8,199,437 B1 | 6/2012 | Sun et al. |
| 8,208,224 B1 | 6/2012 | Teo et al. |
| 8,218,268 B1 | 7/2012 | Pan |
| 8,240,545 B1 | 8/2012 | Wang et al. |
| 8,256,272 B1 | 9/2012 | Roajanasiri et al. |
| 8,295,012 B1 | 10/2012 | Tian et al. |
| 8,295,013 B1 | 10/2012 | Pan et al. |
| 8,295,014 B1 | 10/2012 | Teo et al. |
| 8,320,084 B1 | 11/2012 | Shum et al. |
| 8,325,446 B1 | 12/2012 | Liu et al. |
| 8,325,447 B1 | 12/2012 | Pan |
| 8,339,742 B1 | 12/2012 | Sladek et al. |
| 8,339,747 B1 | 12/2012 | Hales et al. |
| 8,339,748 B2 | 12/2012 | Shum et al. |
| 8,343,363 B1 | 1/2013 | Pakpum et al. |
| 8,345,519 B1 | 1/2013 | Pan |
| 8,418,353 B1 | 4/2013 | Moravec et al. |
| 8,441,896 B2 | 5/2013 | Wang et al. |
| 8,446,694 B1 | 5/2013 | Tian et al. |
| 8,456,643 B2 | 6/2013 | Prabhakaran et al. |
| 8,456,776 B1 | 6/2013 | Pan |
| 8,462,462 B1 | 6/2013 | Moravec et al. |
| 8,476,099 B2 | 7/2013 | Cooney, III et al. |
| 8,477,459 B1 | 7/2013 | Pan |
| 8,485,579 B2 | 7/2013 | Roajanasiri et al. |
| 8,488,279 B1 | 7/2013 | Pan et al. |
| 8,488,281 B1 | 7/2013 | Pan |
| 8,490,211 B1 | 7/2013 | Leary |
| 8,514,522 B1 | 8/2013 | Pan et al. |
| 8,533,936 B1 | 9/2013 | Puttichaem et al. |
| 8,545,164 B2 | 10/2013 | Choumwong et al. |
| 8,553,365 B1 | 10/2013 | Shapiro et al. |
| 8,587,901 B1 | 11/2013 | Puttichaem et al. |
| 8,593,764 B1 | 11/2013 | Tian et al. |
| 8,599,653 B1 | 12/2013 | Mallary et al. |
| 8,605,389 B1 | 12/2013 | Pan et al. |
| 8,611,050 B1 | 12/2013 | Moravec et al. |
| 8,611,052 B1 | 12/2013 | Pan et al. |
| 8,623,197 B1 | 1/2014 | Kobsiriphat et al. |
| 8,624,184 B1 | 1/2014 | Souza et al. |
| 8,665,566 B1 | 3/2014 | Pan et al. |
| 8,665,567 B2 | 3/2014 | Shum et al. |
| 8,665,677 B1 | 3/2014 | Panitchakan et al. |
| 8,665,690 B1 | 3/2014 | Moravec et al. |
| 8,693,144 B1 | 4/2014 | Pan et al. |
| 8,750,081 B1* | 6/2014 | Peng ................. G11B 5/314 |
| | | | 369/13.33 |
| 8,756,795 B1 | 6/2014 | Moravec et al. |
| 8,758,083 B1 | 6/2014 | Rudy et al. |
| 8,760,812 B1 | 6/2014 | Chen et al. |
| 8,770,463 B1 | 7/2014 | Puttichaem et al. |
| 8,773,664 B1 | 7/2014 | Wang et al. |
| 8,792,212 B1 | 7/2014 | Pan et al. |
| 8,792,213 B1 | 7/2014 | Vijay et al. |
| 8,792,312 B1 | 7/2014 | Wang et al. |
| 8,797,691 B1 | 8/2014 | Tian et al. |
| 9,129,634 B1* | 9/2015 | Boone, Jr. ............ G11B 5/6088 |
| 9,165,591 B2* | 10/2015 | Seigler ............ G11B 11/10595 |
| 2009/0310459 A1* | 12/2009 | Gage ................. G11B 5/314 |
| | | | 369/100 |
| 2011/0096435 A1* | 4/2011 | Sasaki ................. G11B 5/1278 |
| | | | 360/114.01 |
| 2011/0122737 A1* | 5/2011 | Shimazawa ............ G11B 5/314 |
| | | | 369/13.24 |
| 2011/0188354 A1* | 8/2011 | Sasaki ................. G11B 11/00 |
| | | | 369/13.32 |
| 2011/0266469 A1 | 11/2011 | Goulakov et al. |
| 2012/0201491 A1* | 8/2012 | Zhou ................. G02B 6/124 |
| | | | 385/14 |
| 2012/0327754 A1* | 12/2012 | Olson ................. H01S 5/026 |
| | | | 369/47.15 |
| 2013/0244541 A1 | 9/2013 | Yaemglin et al. |
| 2013/0293982 A1 | 11/2013 | Huber |
| 2014/0241137 A1* | 8/2014 | Jin ................. G11B 5/4866 |
| | | | 369/13.14 |
| 2015/0049595 A1* | 2/2015 | Smith ................. G11B 5/314 |
| | | | 369/13.33 |
| 2016/0284370 A1* | 9/2016 | Takayama ............. G11B 5/314 |

* cited by examiner

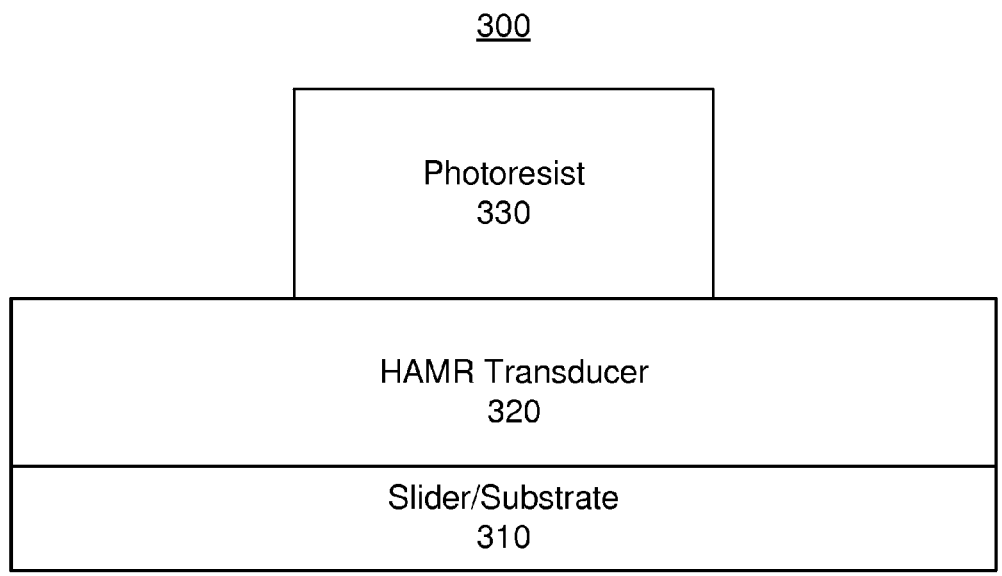
FIG. 8A
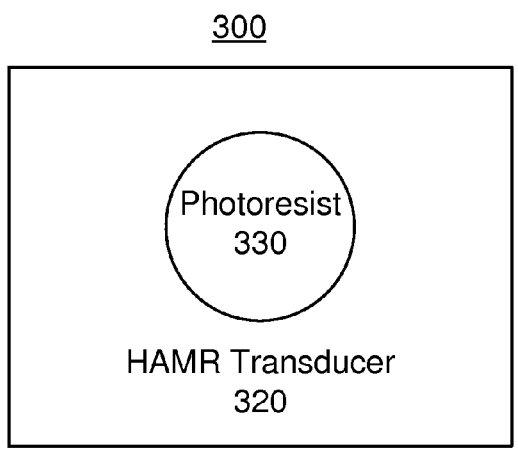 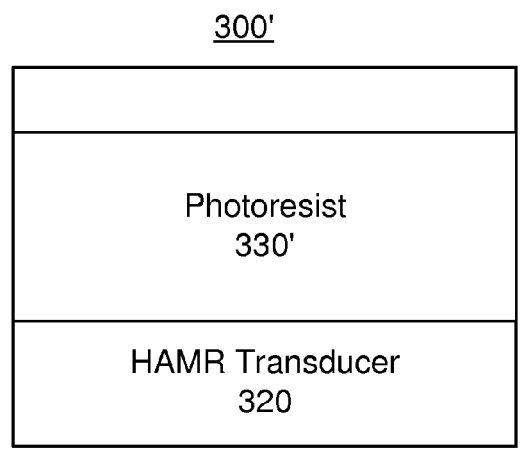
FIG. 8B FIG. 8C

FREE-STANDING REFLECTOR USABLE IN HEAT ASSISTED MAGNETIC RECORDING TECHNOLOGY

BACKGROUND

A conventional heat assisted magnetic recording (HAMR) writer typically includes at least a waveguide, a near-field transducer (NFT), a main pole and a coil for energizing the main pole. The conventional HAMR writer uses light, or energy, received from a conventional laser in order to write to a magnetic recording media. Light from the laser is incident on and coupled into the waveguide. Light is guided by the conventional waveguide to the NFT near the ABS. The NFT focuses the light to a small region of the magnetic recording media, such as a disk. This region is thus heated. The main pole is energized and field from the pole tip is used to write to the heated portion of the recording media.

Although the conventional HAMR writer functions, improvements in performance and fabrication are still desired. For example, improvements in alignment of the laser to the waveguide, bonding, and writing using the HAMR writer are desired to be improved.

BRIEF DESCRIPTION OF SEVERAL VIEWS OF THE DRAWINGS

FIGS. 8A-8C depict side, and alternative plan views of an exemplary embodiment of a HAMR write apparatus during fabrication.

DETAILED DESCRIPTION OF THE PREFERRED EMBODIMENTS

Figure 1A:
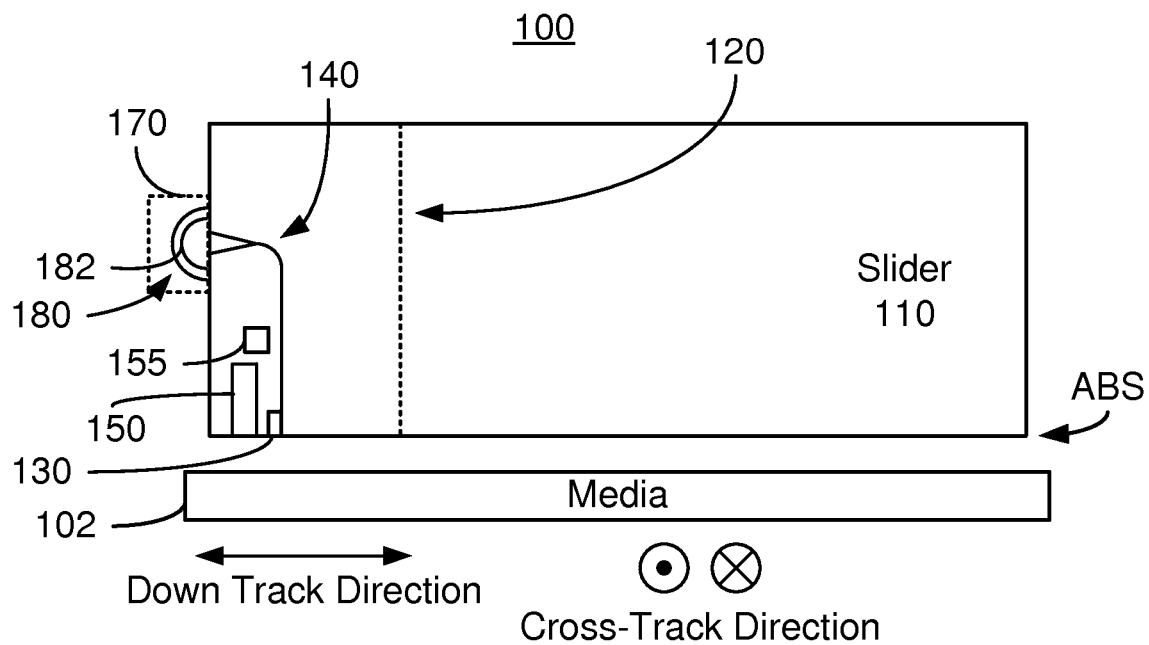
FIGS. 1A and 1B are diagrams depicting side and trailing edge views of an exemplary embodiment of a HAMR disk drive.
Figure 1B:
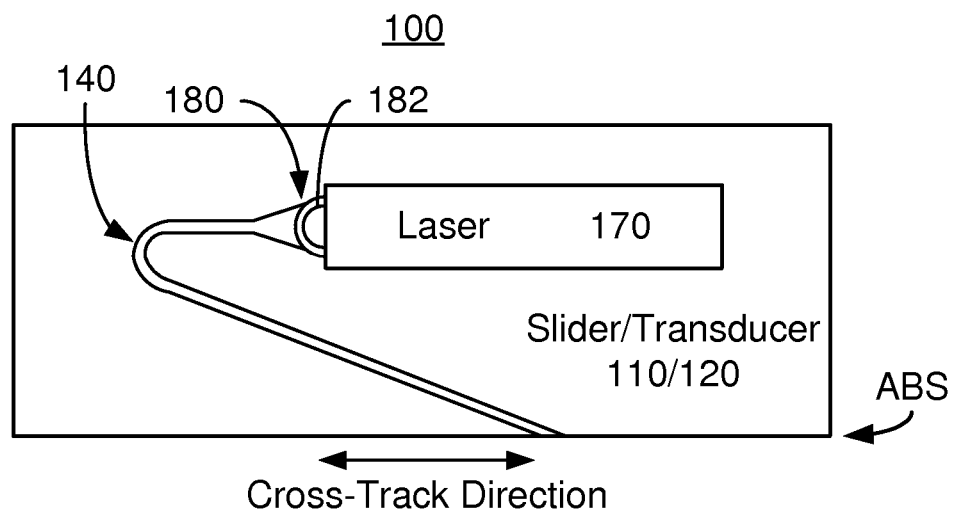

While the various embodiments disclosed are applicable to a variety of data storage devices such as magnetic recording disk drives, solid-state hybrid disk drives, networked storage systems etc., for the sake of illustration the description below will use disk drives as examples. FIGS. 1A and 1B depict side view and trailing edge views of an exemplary embodiment of a portion of a heat-assisted magnetic recording (HAMR) write apparatus, or disk drive 100. For clarity, FIGS. 1A and 1B are not to scale. For simplicity not all portions of the HAMR disk drive 100 are shown. In addition, although the HAMR disk drive 100 is depicted in the context of particular components other and/or different components may be used. For example, circuitry used to drive and control various portions of the HAMR disk drive 100 are not shown. For simplicity, only single components are shown. However, multiples of each component and their sub-components, might be used.

The HAMR disk drive 100 includes media 102, a slider 110, a HAMR transducer 120 and a laser 170. Additional and/or different components may be included in the HAMR disk drive 100. Although not shown, the slider 110, and thus the laser 170 and HAMR transducer 120 are generally attached to a suspension. The laser 170 may be a laser diode, such as an edge emitting layer diode, or other laser.

The HAMR transducer 120 is fabricated on the slider 110 and includes a media facing surface. In the embodiment shown, the media facing surface is an air-bearing surface (ABS). The ABS faces the media 102 during use. The slider also includes a laser-facing surface. The laser 170 resides on the laser-facing surface. In the embodiment shown, the laser-facing surface is the trailing (side) surface of the slider 110. In general, the HAMR write transducer 120 and a read transducer are present in the HAMR disk drive 100. However, for clarity, only the HAMR write transducer 120 is shown. As can be seen in FIGS. 1A-1B, HAMR transducer 120 includes a near-field transducer (NFT) 130, waveguide 140, a write pole 150, coil(s) 155 and free-standing reflector 180. The waveguide 140 is optically coupled with the laser 170 through the free-standing reflector 180. The waveguide 140 carry light energy from the laser 170 toward the ABS. The NFT 130 couples a portion of this energy from the waveguides 140 to the media 102. In some embodiments, the NFT 130 occupies a portion of the ABS. The NFT 130 transfers energy to the media 102. The write pole 150 is energized by the coils 155 and writes to the media 102. The coil(s) 155 may be solenoidal or spiral (pancake) coils. Other components including but not limited to other poles and/or shields may also be present.

The free-standing reflector 180 resides on the same surface as the laser 170. In the embodiment shown, therefore, the free-standing reflector 180 is on the trailing surface of the slider 110. The free-standing reflector 180 is so termed because the reflector is not formed in a large, solid enclosure within which a well has been formed and the material(s) for the reflector have been deposited. Such a reflector may be bonded to the slider 110. Instead, the free-standing reflector may be formed on the trailing edge of the slider 110, before the sliders 110 have been separated from the wafer. For example, multiple free-standing reflectors 180 may be fabricated on the surface of the wafer after the photolithography for the HAMR transducers 120 has essentially been completed. After formation of the free-standing reflectors 180, the wafer may be separated into row bars containing multiple transducers 120 and multiple free-standing reflectors 180 and lapped. The row bars may then be separated into individual sliders. Because of the orientation of the sliders 110 during fabrication, the top surface of the wafer becomes the trailing surface of the slider 110. Thus, the free-standing reflector 180 may stand alone on the surface of the slider before attachment of the laser 170. However, other methods for fabricating the free-standing reflector 180 and slider 110 may be used.

The free-standing reflector 180 includes a concave reflective surface 182 oriented to receive the energy from the laser 170. In the embodiment shown, the concave reflective surface 182 is curved in the down track and cross-track directions as well as in the direction perpendicular to the ABS. In some embodiments, the concave reflective surface 182 is a section of a sphere. In other embodiments, the concave reflective surface 182 may be a parabolic surface. One of ordinary skill in the art will recognize that a parabolic surface may be approximated by a spherical surface. Thus, the free-standing reflector 180 is functional for either case. For both a spherical reflective surface and a parabolic reflective surface, the concave reflective surface tends to concentrate light from the laser 170 into the waveguide 140. Because it is free-standing and fabricated as described below, the reflector 180 may also be made small. For example, the free-standing reflector 180 may have a height measured from the laser-facing (trailing) surface of not more than one hundred micrometers. The concave reflective surface may thus have a small radius of curvature. For example, the radius of curvature may not exceed one hundred microns in some embodiments. In some such cases, the radius of curvature is on the order of sixty through eighty micrometers. In other embodiments, other radii of curvature might be possible.

In operation, the laser 170 emits light energy that travels to the free-standing reflector. The light is reflected off of the concave reflective surface 182. The reflected light is both directed toward the waveguide 140 and concentrated to a smaller spot size. The waveguide 140 may further concentrate the light and direct the light toward the NFT 130. Light is coupled into the NFT 130, then delivered to a small post on the media 102. The coils 155 energize the pole 150, which writes to the heated region of the media 102.

The HAMR disk drive 100 may exhibit enhanced performance. Using the free-standing reflector 180, light may be more readily transferred from the laser 170 to the waveguide 140. Stated differently, misalignments may be better accounted for. In addition, the free-standing reflector 180 for each slider 110 may be fabricated on the top surface of the wafer. Thus, the free-standing reflector may be formed and aligned using photolithography techniques. As a result, the location of the free-standing reflector 180 with respect to the entrance of the waveguide 140 may be better known. In addition, multiple free-standing reflectors may be manufactured substantially simultaneously. Further, the free-standing reflector 180 may be used as a stop for alignment of the laser 170. For these reasons, alignment of the laser 170 to the waveguide 140 may be improved. In addition, the cavity formed between the laser 170 and the concave reflective surface 182 may be sealed by depositing an encapsulant on the laser 170 and free-standing reflector 180 once alignment and bonding have occurred. This cavity may, therefore, be sealed. Thus, fabrication and performance of the HAMR disk drive 100 may be improved.

Figure 2A:
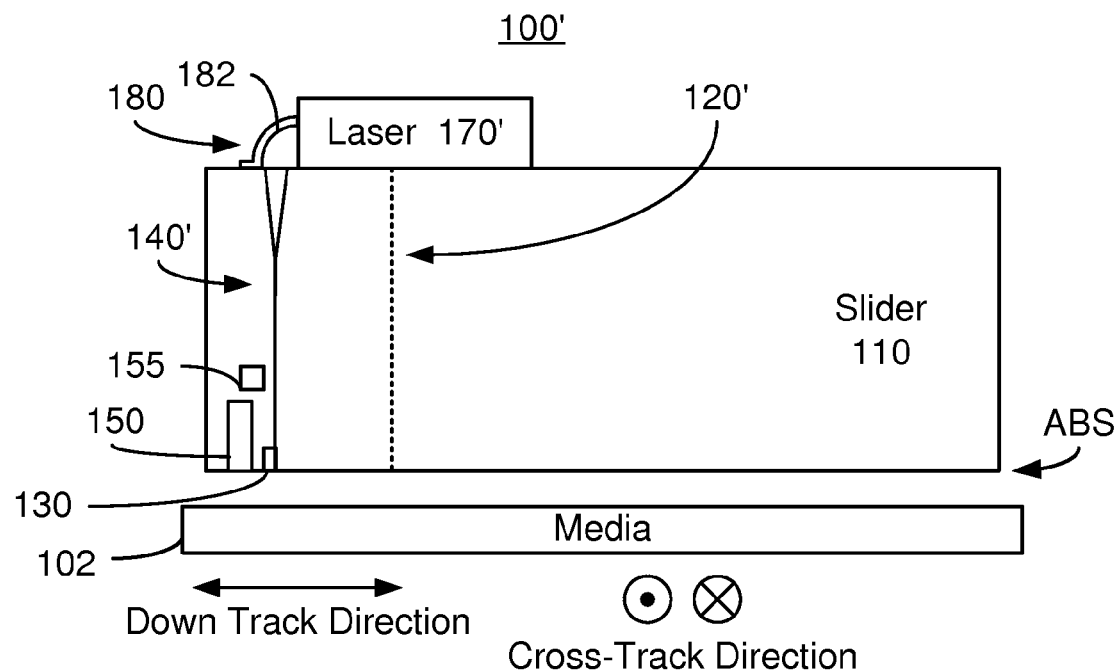
FIGS. 2A and 2B are diagrams depicting side and trailing edge views of another exemplary embodiment of a HAMR disk drive.
Figure 2B:
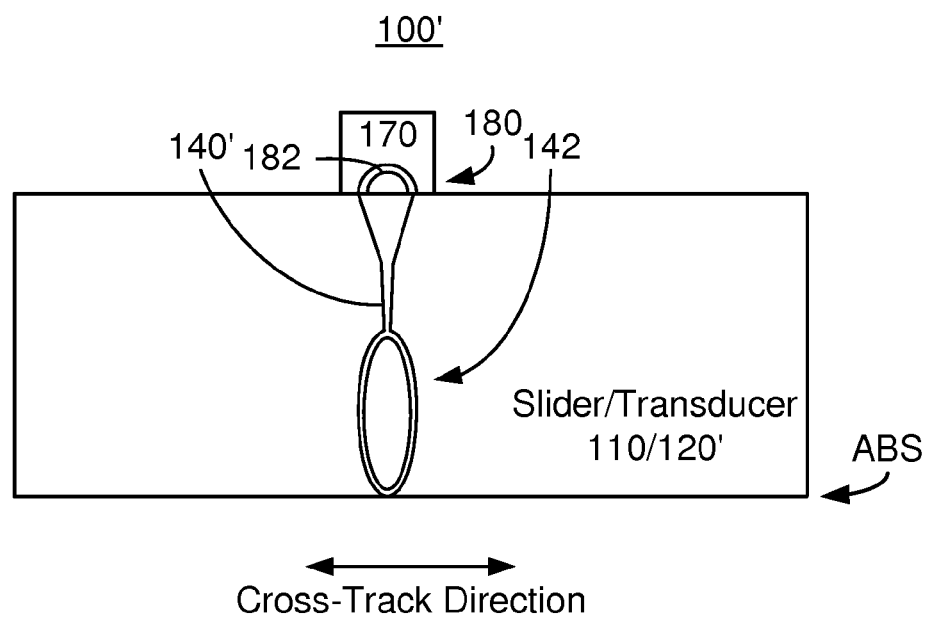

FIGS. 2A and 2B depict side and trailing edge views of another exemplary embodiment of a portion of the HAMR disk drive 100'. For clarity, FIGS. 2A-2B are not to scale. For simplicity not all portions of the HAMR disk drive 100' are shown. In addition, although the HAMR disk drive 100' is depicted in the context of particular components other and/or different components may be used. Further, the arrangement of components may vary in different embodiments. The HAMR disk drive 100' is analogous to the HAMR disk drive 100. Consequently, similar components have analogous labels. The HAMR disk drive 100' thus includes a laser 170 and a HAMR transducer 120' that are analogous to the laser 170 and HAMR transducer 120, respectively. The HAMR transducer 120' includes NFT 130, waveguide 140', pole 150, coil(s) 155 and free-standing reflector 180 that are analogous to the NFT 130, waveguide 140, pole 150, coil(s) 155 and free-standing reflector 180, respectively. The structure and function of the components 130, 140', 150, 155 and 180 are analogous to the structure and function of the components 130, 140, 150, 155 and 180, respectively.

The HAMR transducer 120' is fabricated on the slider 110 and includes an ABS and top surface opposite to the ABS. In the embodiment shown, the laser-facing surface is the top surface of the slider 110. In general, the HAMR write transducer 120' and a read transducer are present in the HAMR disk drive 100'. However, for clarity, only the HAMR write transducer 120' is shown.

The free-standing reflector 180 resides on the same surface as the laser 170. In the embodiment shown, therefore, the free-standing reflector 180 is on the top surface of the slider 110. Note, however, that because the trailing surface of the slider 110 is generally the top surface of the wafer during fabrication, that the free-standing reflector 180 may be fabricated individually on the slider 110 after the wafer has been diced into sliders. However, other fabrication methods may be used for the slider 110, HAMR transducer 120' and free-standing reflector 180.

The free-standing reflector 180 includes a concave reflective surface 182 oriented to receive the energy from the laser 170. The concave reflective surface 182 may be spherical, parabolic or an analogous curve. In the embodiment shown, the concave reflective surface 182 is curved in the down track and cross-track directions as well as in the direction perpendicular to the ABS. The concave reflective surface 182 tends to concentrate light from the laser 170 into the waveguide 140. Because it is free standing, the reflector 180 may also be made small. The free-standing reflector 180 may have a height measured from the laser-facing (trailing) surface of not more than one hundred micrometers. The concave reflective surface 182 may thus have a small radius of curvature. For example, the radius of curvature may not exceed one hundred microns in some embodiments. In some such cases, the radius of curvature is on the order of sixty through eighty micrometers. Other radii of curvature might be possible.

In the embodiment shown in FIGS. 2A-2B, the waveguide 140' is an interferometric tapered waveguide (ITWG) 140'. Thus, the ITWG 140' includes arms 142 through which two channels of light from the laser 170 are carried. Near the NFT 130, the light is recombined to form an interference pattern. Although not indicated in FIGS. 1A-1B, the waveguide 140 may be an ITWG. Similarly, in other embodiments, the waveguide 140' need not be an ITWG.

The HAMR disk drive 100' shares the benefits of the HAMR disk drive 100. The free-standing reflector 180 may be better aligned with the laser 170 and may be better able to account for misalignments of the laser 170. Light may be more readily transferred from the laser 170 to the waveguide 140. In addition, the cavity formed between the laser 170 and the concave reflective surface 182 may be sealed by providing an encapsulant once alignment and bonding of the laser 170 have completed. Thus, performance of the HAMR disk drive 100' may be improved.

Figure 3A:
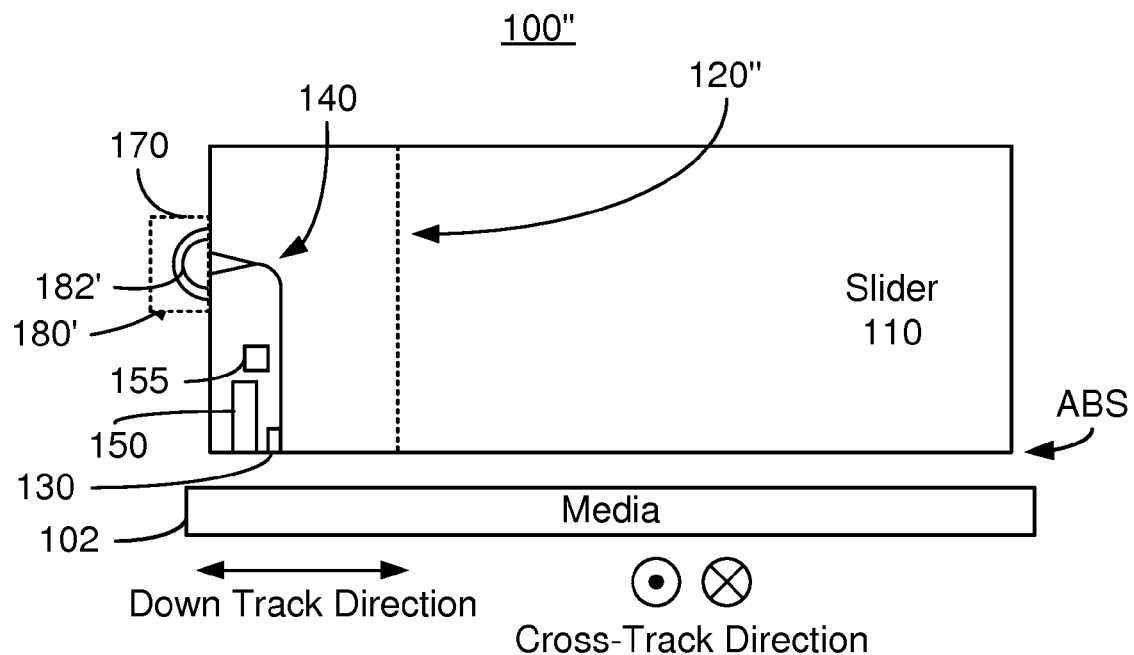
FIGS. 3A and 3B are diagrams depicting side and trailing edge views of another exemplary embodiment of a HAMR disk drive.
Figure 3B:
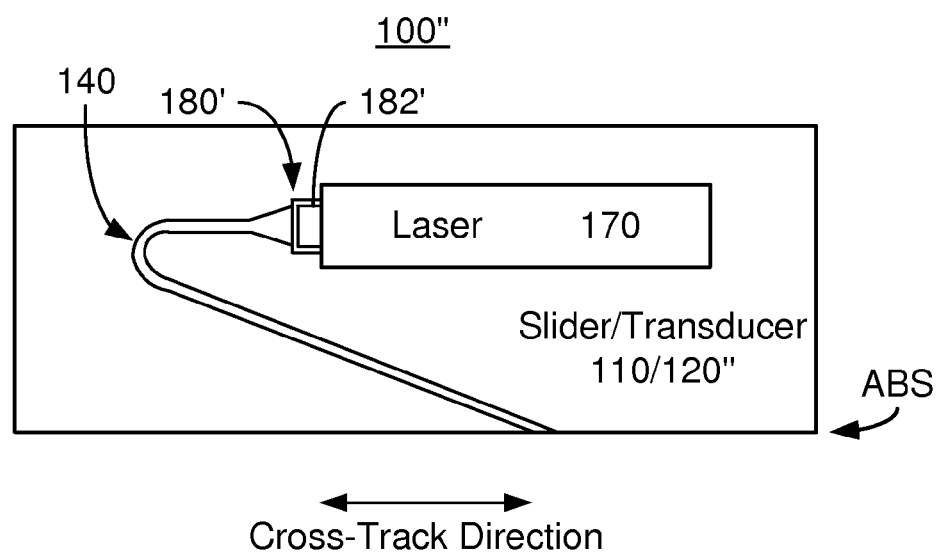

FIGS. 3A and 3B depict side and trailing edge views of another exemplary embodiment of a portion of the HAMR disk drive 100". For clarity, FIGS. 3A-3B are not to scale. For simplicity not all portions of the HAMR disk drive 100" are shown. In addition, although the HAMR disk drive 100" is depicted in the context of particular components other and/or different components may be used. Further, the arrangement of components may vary in different embodiments. The HAMR disk drive 100″ is analogous to the HAMR disk drive(s) 100 and/or 100′. Consequently, similar components have analogous labels. The HAMR disk drive 100″ thus includes a laser 170 and a HAMR transducer 120″ that are analogous to the laser 170 and HAMR transducer 120/120′, respectively. The HAMR transducer 120″ includes NFT 130, waveguide 140, pole 150, coil(s) 155 and free-standing reflector 180′ that are analogous to the NFT 130, waveguide 140/140′, pole 150, coil(s) 155 and free-standing reflector 180, respectively. The structure and function of the components 130, 140, 150, 155 and 180′ are analogous to the structure and function of the components 130, 140/140′, 150, 155 and 180, respectively.

The HAMR transducer 120″ is fabricated on the slider 110 and includes an ABS and top surface opposite to the ABS. In the embodiment shown, the laser-facing surface is the trailing surface of the slider 110. In general, the HAMR write transducer 120″ and a read transducer are present in the HAMR disk drive 100″. However, for clarity, only the HAMR write transducer 120′ is shown.

The free-standing reflector 180′ resides on the same surface as the laser 170. In the embodiment shown, therefore, the free-standing reflector 180′ is on the trailing surface of the slider 110. Thus, the free-standing reflector 180′ may be formed on the top surface of the wafer on which the HAMR transducers 120″ are fabricated. In an alternate embodiment, the free-standing reflector 180′ may reside on the top surface of the slider 110, as in the HAMR disk drive 100′.

The free-standing reflector 180′ includes a concave reflective surface 182′ oriented to receive the energy from the laser 170. In the embodiment shown, the concave reflective surface 182′ is curved in the down track and in the direction perpendicular to the ABS. In some embodiments, the curve of the concave reflective surface 182′ shown in FIG. 3A may be circular or parabolic. However, the concave reflective surface 182′ is not curved in the cross-track direction, as can be seen in FIG. 3B. Thus, the concave reflective surface 182′ may be cylindrical rather than spherical. The concave reflective surface 182′ still tends to concentrate light from the laser 170 into the waveguide 140. Because it is free standing, the reflector 180′ may also be made small. The free-standing reflector 180′ may have a height measured from the laser-facing (trailing) surface of not more than one hundred micrometers. The concave reflective surface 182′ may thus have a small radius of curvature. For example, the radius of curvature may not exceed one hundred microns in some embodiments. In some such cases, the radius of curvature is on the order of sixty through eighty micrometers. Other radii of curvature might be possible.

The HAMR disk drive 100″ shares the benefits of the HAMR disk drive 100. The free-standing reflector 180′ may be better aligned with the laser 170 and may be better able to account for misalignments of the laser 170. Light may be more readily transferred from the laser 170 to the waveguide 140. In addition, the cavity formed between the laser 170 and the concave reflective surface 182′ may be sealed by providing an encapsulant once alignment and bonding of the laser 170 have completed. Thus, performance of the HAMR disk drive 100″ may be improved.

Figure 4:
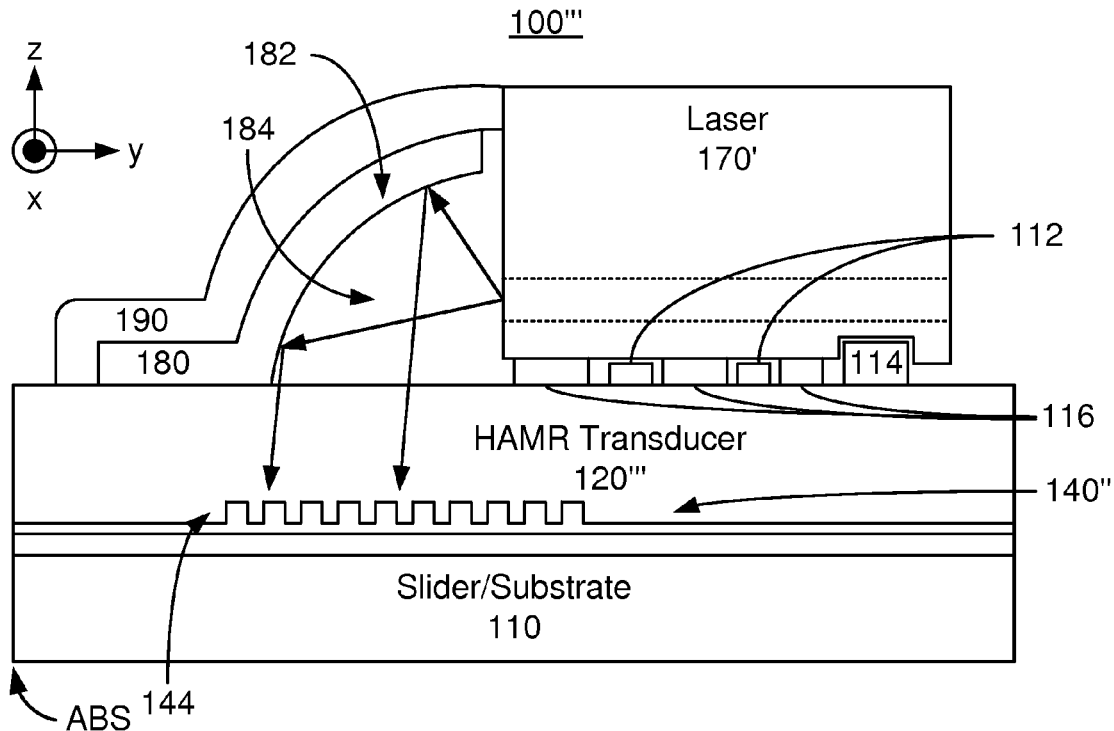
FIG. 4 is a diagram depicting a side view of another exemplary embodiment of a HAMR disk drive.

FIG. 4 depicts a close-up side views of another exemplary embodiment of a portion of the HAMR disk drive 100′″. For clarity, FIG. 4 is not to scale. For simplicity not all portions of the HAMR disk drive 100′″ are shown. In addition, although the HAMR disk drive 100′″ is depicted in the context of particular components other and/or different components may be used. Further, the arrangement of components may vary in different embodiments. The HAMR disk drive 100′″ is analogous to the HAMR disk drive(s) 100, 100′ and/or 100″. Consequently, similar components have analogous labels. The HAMR disk drive 100′″ thus includes a laser 170′ and a HAMR transducer 120′″ having waveguide 140″ that are analogous to the laser 170, HAMR transducer 120/120′ and waveguide 140/140′, respectively. The structure and function of the components 110, 120′″, 170′ and 180 are analogous to the structure and function of the components 110, 120/120′/120″, 170 and 180, respectively.

The free-standing reflector 180 resides on the same surface as the laser 170′. In the embodiment shown, the laser resides on the trailing surface of the slider 110. However, in other embodiments, the laser 170′ and free-standing reflector 180 may be on the top surface of the slider 110 or another surface. The free-standing reflector 180 includes a concave reflective surface 182 oriented to receive the energy from the laser 170′. The curve of the concave reflective surface 182 shown in FIG. 4 may be circular or parabolic. Thus, the concave reflective surface 182 may be spherical, conical, or parabolic in nature. The concave reflective surface 182 tends to concentrate light from the laser 170′ into the waveguide 140″. Because it is free standing, the reflector 180 may also be made small. The free-standing reflector 180 may have a height measured from the laser-facing (trailing) surface of not more than one hundred micrometers. The concave reflective surface 182 may thus have a small radius of curvature. For example, the radius of curvature may not exceed one hundred microns in some embodiments. In some such cases, the radius of curvature is on the order of sixty through eighty micrometers. Other radii of curvature might be possible. The concave reflective surface 182 directs light (shown by rays/arrows) from the exit of the laser 170′ toward an input grating 144 for the waveguide 140″. In other embodiments, the light from the concave reflective surface 182 may be coupled into the waveguide 140″ in another manner.

FIG. 4 also depicts solder 116 used to bond the laser 170′ to the slider 110. Also shown are alignment control barriers 112 and 114. As discussed above, the free-standing reflector 180 may be used as a stop for aligning the laser 170′. For example, the free-standing reflector 180 may act as a stop in the y direction. The alignment control barriers 112 may function in the y direction and/or the x direction. The alignment control barrier 114 may control alignment in the z direction as well as in the y and/or x directions. Alignment in the x and y directions allows the laser 170′ to be placed in the desired location with respect to the waveguide 140 and free-standing reflector 180. Alignment in the z-direction may be carried out to place the point of emission at the desired location with respect to the reflective surface 182. For example, the region through which light is emitted may be placed at or near the focus of the concave reflective surface 182. These alignment control barriers 112 and 114 may be fabricated at substantially the same time as the free-standing reflector 180.

In addition, encapsulant 190 is shown. Encapsulant 190 may be deposited on the surface of the trailing surface of the slider after the laser 170′ has been aligned and bonded. Thus, a sealed cavity 184 may be formed between the laser 170′ and reflective surface 182.

The HAMR disk drive 100′″ shares the benefits of the HAMR disk drive(s) 100, 100′ and/or 100″. The free-standing reflector 180 may be better aligned with the laser 170′ and may be better able to account for misalignments of the laser 170. Use of the alignment control barriers 112 and 114 may further improve alignment. Light may be more readily transferred from the laser 170' to the waveguide 140. In addition, the sealed cavity 184 formed between the laser 170' and the concave reflective surface 182 may be sealed by providing an encapsulant once alignment and bonding of the laser 170' have completed. Thus, performance of the HAMR disk drive 100''' may be improved.

Note that various features are highlighted in the configurations depicted in FIGS. 1A-1B, 2A-2B, 3A-3B and 4. However, one of ordinary skill in the art will recognize that features of the HAMR disk drives 100, 100', 100'' and/or 100''' may be combined in manners not inconsistent with the method and system described herein.

Figure 5:
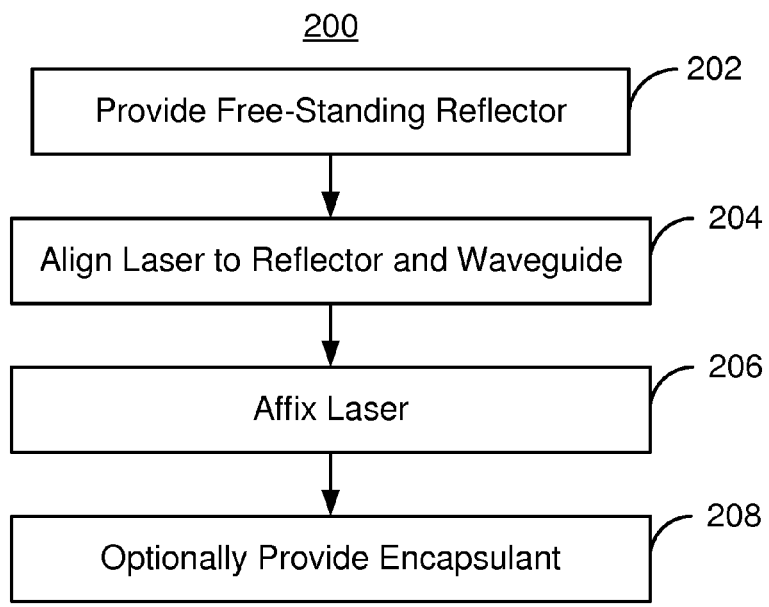
FIG. 5 is a flow chart depicting an exemplary embodiment of a method for fabricating a HAMR write apparatus.

FIG. 5 is a flow chart depicting an exemplary embodiment of a method 200 for fabricating a HAMR write apparatus. The method 200 may be used in fabricating disk drives such as the disk drives 100, 100', 100'' and/or 100''', though other disk drives and/or other write apparatus might be so fabricated. For clarity, the method 200 is described in the context of the disk drive 100''' depicted in FIG. 4. For simplicity, some steps may be omitted, performed in another order, interleaved and/or combined. The HAMR disk drives being fabricated may include a write transducer and a read transducer (not shown) and resides on a slider. For simplicity, however, the read transducer is not discussed. The method 200 is also described in the context of forming a transducer. However, the method 200 may be used to fabricate multiple transducer(s) at substantially the same time. The method 200 and system are also described in the context of particular layers. However, in some embodiments, such layers may include multiple sub-layers. The method 200 also may commence after formation of other portions of the disk drive. For example, the method 200 may start after the photolithography for the HAMR transducer 120/120' has been completed. In one embodiment, for the HAMR disk drives 100, 100'' and/or 100''', the method 200 is performed before the wafer containing the sliders 110 has been diced. Thus, the individual sliders have not been separated. However, groups of sliders may have been separated into row bars. In an alternate embodiment, the free-standing reflector 180 may be provided for individual sliders. For the HAMR disk drive 100', for example, the method 200 may occur after the sliders 110 have been diced.

The free-standing reflector 180 is provided on the laser-facing surface, via step 202. Step 202 includes providing the concave reflective surface 182 as well as any support structure, such as a metallic layer. Step 202 may include providing a sacrificial structure having the desired geometry for the curved reflective surface 182, depositing the material(s) for the remainder of the free-standing reflector 180/180' and removing the sacrificial structure. These processes may be carried out on the top of the surface of the wafer containing the transducers 120'''.

The laser 170' may be aligned to the free-standing reflector 180 and to the waveguide 140'', via step 204. Step 204 may include aligning the laser 170' in the x, y and z directions. Note that the alignment in step 204 may include using the alignment control barriers 112 and 114. The laser 170' may be affixed to the slider 110, via step 206. Step 206 may include solder bonding the laser 170' to the slider 110 using solder bonds 116.

The encapsulant 190 may optionally be provided, via step 208. Step 208 may include depositing the encapsulant materials 190 at an angle from normal to the laser-facing surface. Fabrication of the disk drive 100''' may then be completed.

Using the method 200, therefore, the benefit(s) of the HAMR disk drives 100, 100', 100'' and/or 100''' may be realized.

Figure 6:
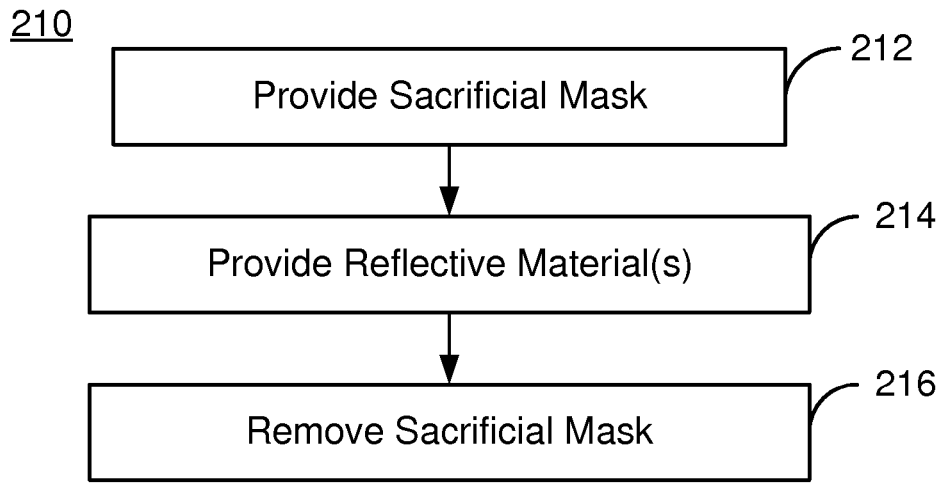
FIG. 6 is a flow chart depicting another exemplary embodiment of a method for fabricating a free standing reflector for a HAMR write apparatus.

FIG. 6 is a flow chart depicting an exemplary embodiment of a method 210 for fabricating a free-standing reflector for a HAMR write apparatus. The method 210 may be used in fabricating free-standing reflectors 180/180' for disk drives such as the disk drives 100, 100', 100'' and/or 100''', though other free-standing reflectors for other write apparatus might be so fabricated. For clarity, the method 210 is described in the context of the disk drive 100''' depicted in FIG. 4. For simplicity, some steps may be omitted, performed in another order, interleaved and/or combined. The HAMR disk drives being fabricated may include a write transducer and a read transducer (not shown) and resides on a slider. For simplicity, however, the read transducer is not discussed. The method 210 is also described in the context of forming a free-standing reflector for a transducer. However, the method 210 may be used to fabricate multiple free-standing reflectors for multiple transducer(s) at substantially the same time. The method 210 and related system are also described in the context of particular layers. However, in some embodiments, such layers may include multiple sub-layers. The method 210 also may commence after formation of other portions of the disk drive. For example, the method 210 may start after the HAMR transducer 120/120' has been fabricated.

A sacrificial structure having the desired geometry for the curved reflective surface 182 is fabricated, via step 212. Step 212 may include fabricating a photoresist mask having a profile corresponding to the shape of the reflective surface 182. For example, the mask may have a convex portion that is the mirror image of the concave portion of the free-standing reflector 180/180'. For example, the sacrificial structure may be a section of a sphere, a parabola, a cylinder or another solid having a curved surface.

The material(s) for the reflective surface are deposited, via step 214. For example, step 214 may include depositing Au. Step 214 includes depositing the material(s) for the remainder of the free-standing reflector 180/180'. For example, Cr, Rh, Ti and/or another corrosion barrier might be provided. The corrosion barrier may also act as mechanical support for the reflective surface materials(s). The sacrificial mask may be removed, via step 216. Step 216 may include stripping the photoresist mask.

Using the method 210, therefore, the free-standing reflector 180/180' may be fabricated. Consequently, the benefit(s) of the HAMR disk drives 100, 100', 100'' and/or 100''' may be realized.

Figure 7:
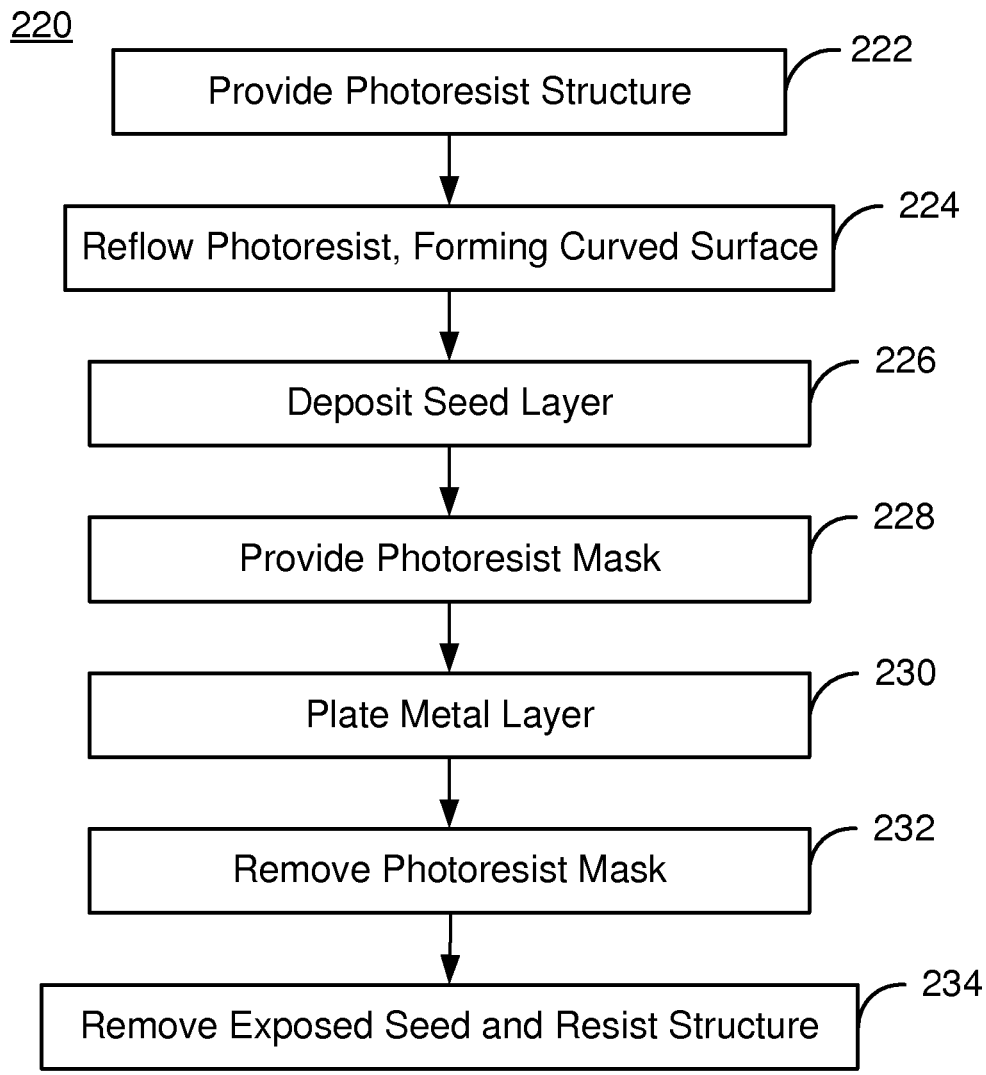
FIG. 7 is a flow chart depicting another exemplary embodiment of a method for fabricating a free-standing reflector for a HAMR write apparatus.

FIG. 7 is a flow chart depicting an exemplary embodiment of a method 220 for fabricating a free-standing reflector for a HAMR write apparatus. The method 220 may be used in fabricating free-standing reflectors 180/180' for disk drives such as the disk drives 100, 100', 100'' and/or 100''', though other free-standing reflectors for write apparatus might be so fabricated. For simplicity, some steps may be omitted, performed in another order, interleaved and/or combined. FIGS. 8A-8C through FIG. 17 depict a portion of a HAMR disk drive 300 during fabrication using the method 220. FIGS. 8A-17 are not to scale and not all components of the disk drive 300 are shown. The HAMR disk drives being fabricated may include a write transducer and a read transducer (not shown) and resides on a slider. For simplicity, however, the read transducer is not discussed. The method 220 is also described in the context of forming a single HAMR disk drive 300. However, the method 220 may be used to fabricate multiple disk drives at substantially the same time. The method 220 and related system are also described in the context of particular layers. However, in some embodiments, such layers may include multiple sublayers. The method 220 also may commence after formation of other portions of the disk drive. For example, the method 220 starts after the HAMR transducer 320 on slider 310 has been completed. Note that the HAMR transducer 320 and slider 310 are analogous to the transducers 120, 120', 120" and 120''' and slider 110, respectively.

A photoresist structure having a physical dimension corresponding to a dimension of the convex portion of a sacrificial mask is provided, via step 222. Step 222 may include providing a photoresist structure using conventional photolithography. FIG. 8A depicts a side view of the photoresist structure 330 fabricated on the transducer 320. Note that the slider 310 and transducer 320 may be part of a larger wafer on which multiple transducers 320 are being formed. Thus, multiple photoresist structures 330 may be formed. FIGS. 8B and 8C depict plan views of two embodiments of the photoresist structure. FIG. 8B depicts the photoresist structure 330 that is formed as a post. Thus, the photoresist structure 330 has a circular footprint. The photoresist structure 330 is used to form a hemispherical (or half-parabolic) sacrificial mask. In contrast, FIG. 8C depicts a photoresist structure 330' for a HAMR disk drive 300' that is a short line. Thus, the photoresist structure 330' has a rectangular footprint. The photoresist structure 330' will be used to form a sacrificial mask that is roughly half-cylindrical in shape. The radius of the circle for the photoresist post 330 and the length of the short side of the photoresist rectangle 330' roughly determine the radii of the hemi-sphere and half cylinder, respectively, formed. In some embodiments, the photoresist structures 330 and 330' are provided without using an adhesion layer on the HAMR transducer 320. Consequently, the photoresist structures 330 and 330' do not wet the surface and may more readily reflow. In other embodiments, an adhesion layer may be used in the area covered by the photoresist post 330 and line 330', respectively.

Figure 9:
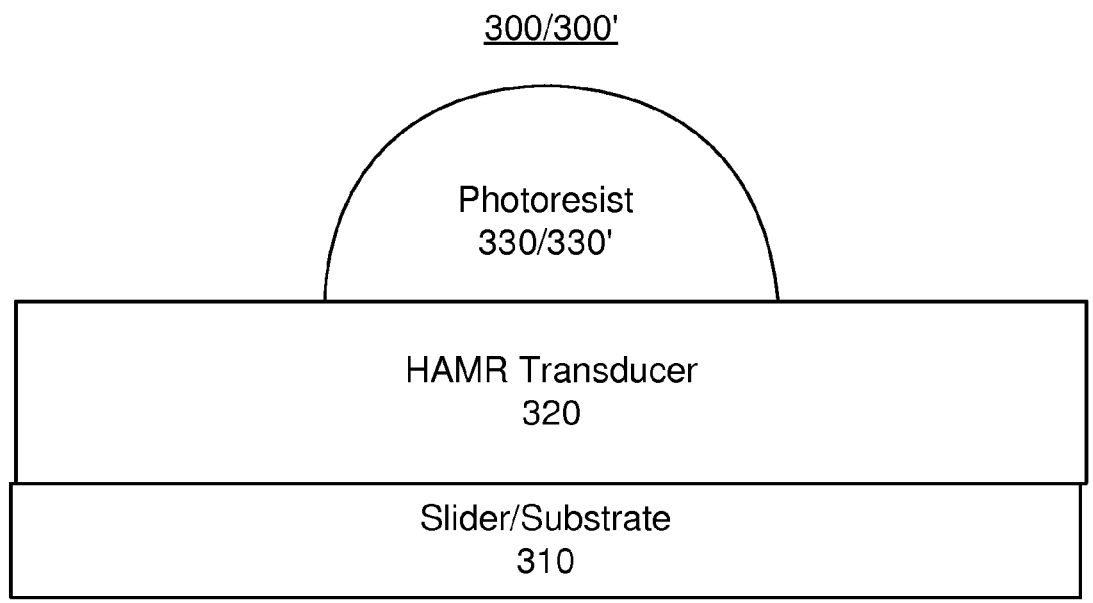
FIGS. 9-17 are side views of an exemplary embodiment of a HAMR write apparatus during fabrication.

The photoresist structure 330/330' is heated such that the photoresist structure 330/330' reflows, via step 224. The precise temperature to which the photoresist structure 330/330' is heated depends upon the photoresist used. The reflow temperature of a particular type of photoresist is generally known. FIG. 9 depicts a side view of the photoresist structure 330/330' in the HAMR disk drive(s) 300/300' after step 224 is performed. Thus, the photoresist structure 330/330' has reflowed to have a curved cross section. For simplicity, the photoresist structure 330/330' is termed a hemisphere. However, other curves are possible. Thus, the photoresist structure 330/330' forms a sacrificial mask.

Figure 10:
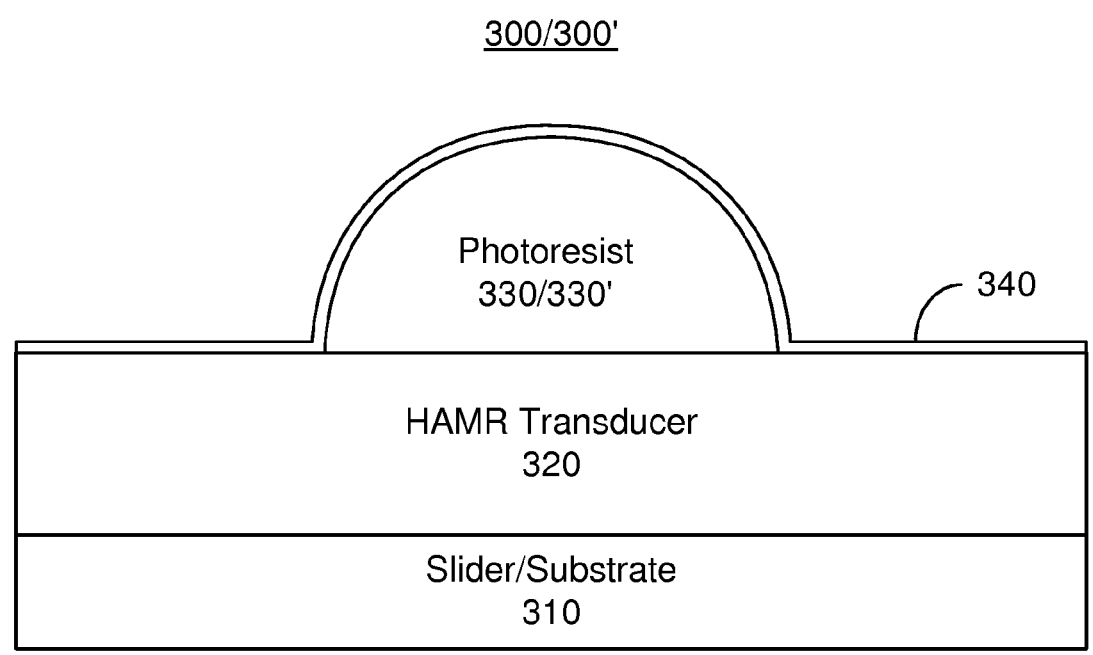

A reflective seed layer that covers the sacrificial mask is deposited, via step 226. Step 226 may include depositing an Au layer. However, other reflective conductive materials may be used. FIG. 10 depicts a side view of the HAMR disk drive(s) 300/300'. Thus, a seed layer 340 has been provided. In the embodiment shown, the seed layer covers the surface of the wafer. In other embodiments, the deposition may be carried out such that the seed layer covers only a portion of the exposed portion of the HAMR disk drives 300/300'.

Figure 11:
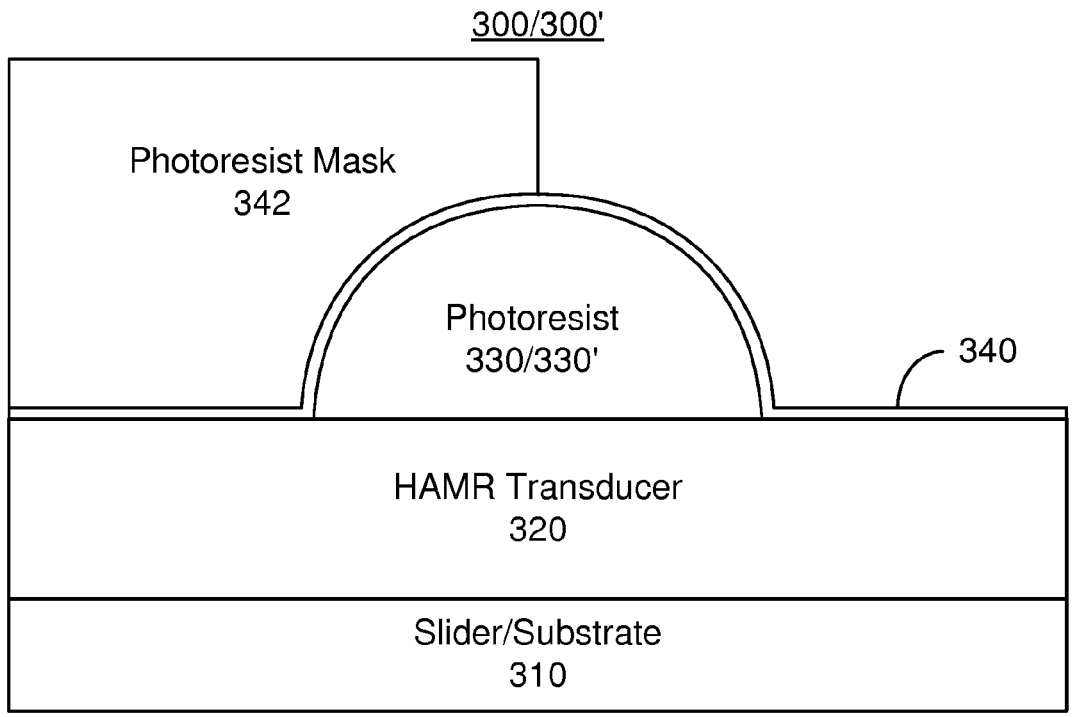

A mask that covers a portion of the sacrificial structure 330/330' is provided, via step 228. In some embodiments, step 228 includes fabricating a photoresist mask that covers the portion of the reflective seed layer 340 that is not present in the final device. FIG. 11 depicts the HAMR disk drive(s) 300/300' after step 228 has been performed. Thus, photoresist mask 342 resides on a part of the seed layer 340.

Figure 12:
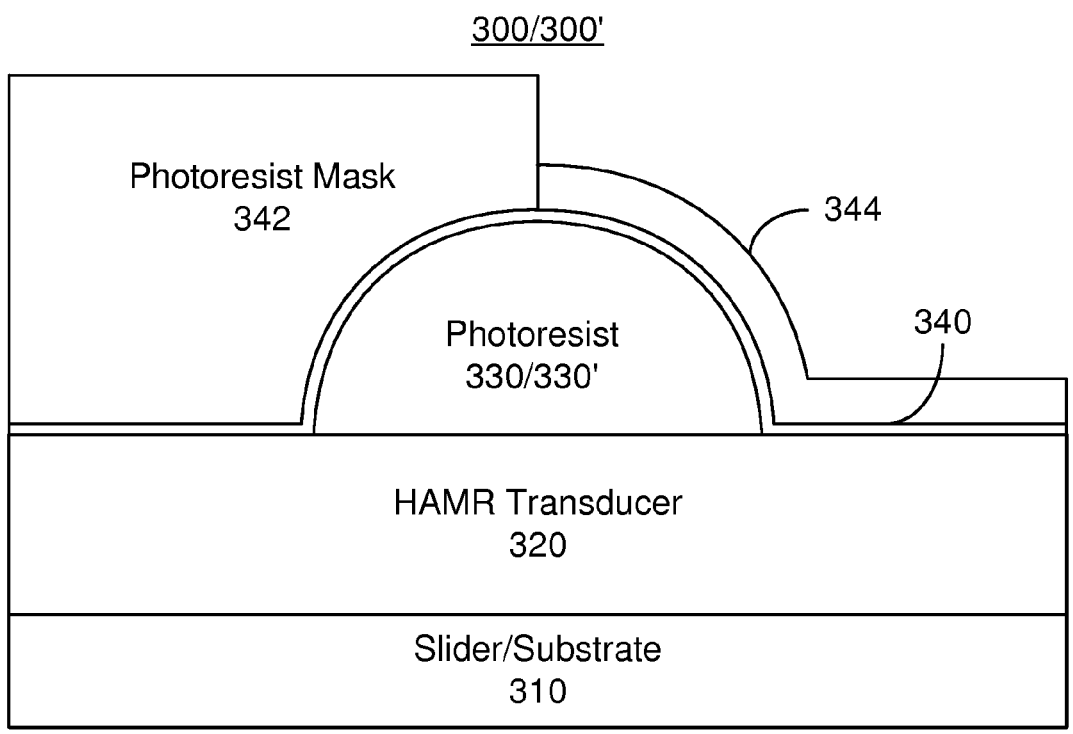

One or more metal layers are deposited, via step 230. This step may include plating the metal layer(s). The metal layers provided in step 230 may prevent corrosion and/or provide mechanical support for the portion reflective seed layer 340 that will function as a mirror. The metal layer(s) may include Cr, Rh, Ti and/or other analogous materials. FIG. 12 depicts a side view of the HAMR disk drive(s) 300/300' after step 230 is performed. Thus, metal layer(s) 344 have been deposited.

Figure 13:
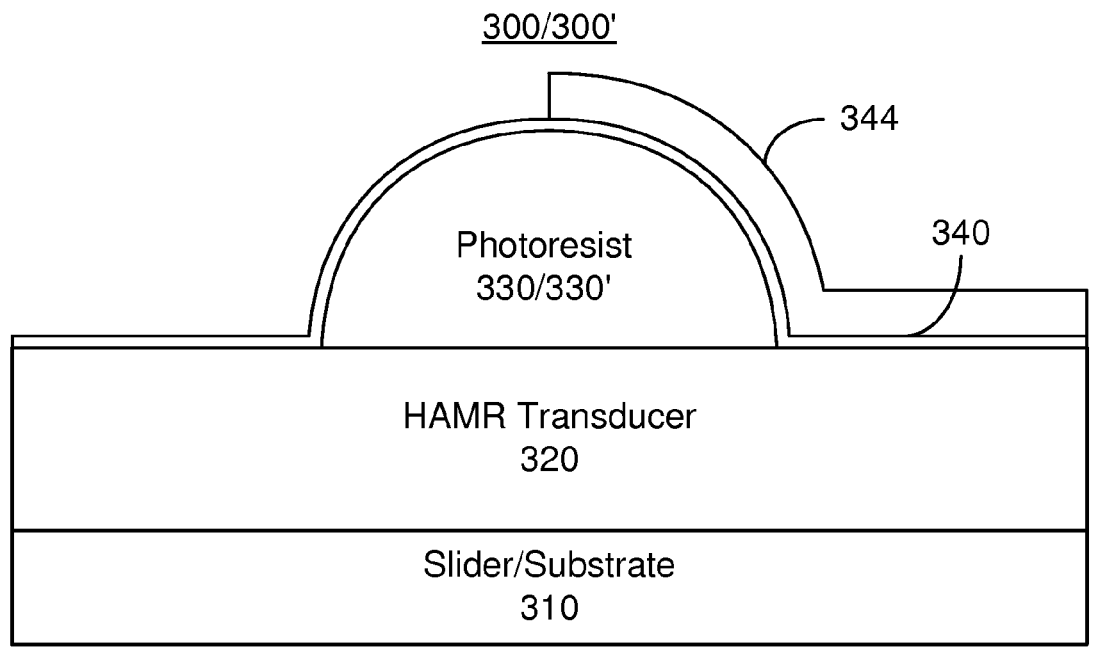

The photoresist mask 342 is removed, via step 232. Step 232 may include stripping the photoresist mask 342. FIG. 13 depicts the HAMR disk drive(s) 300/300' after removal of the mask. Thus, a portion of the seed layer 340 is covered by the metal layers 344, while another portion is exposed.

Figure 14:
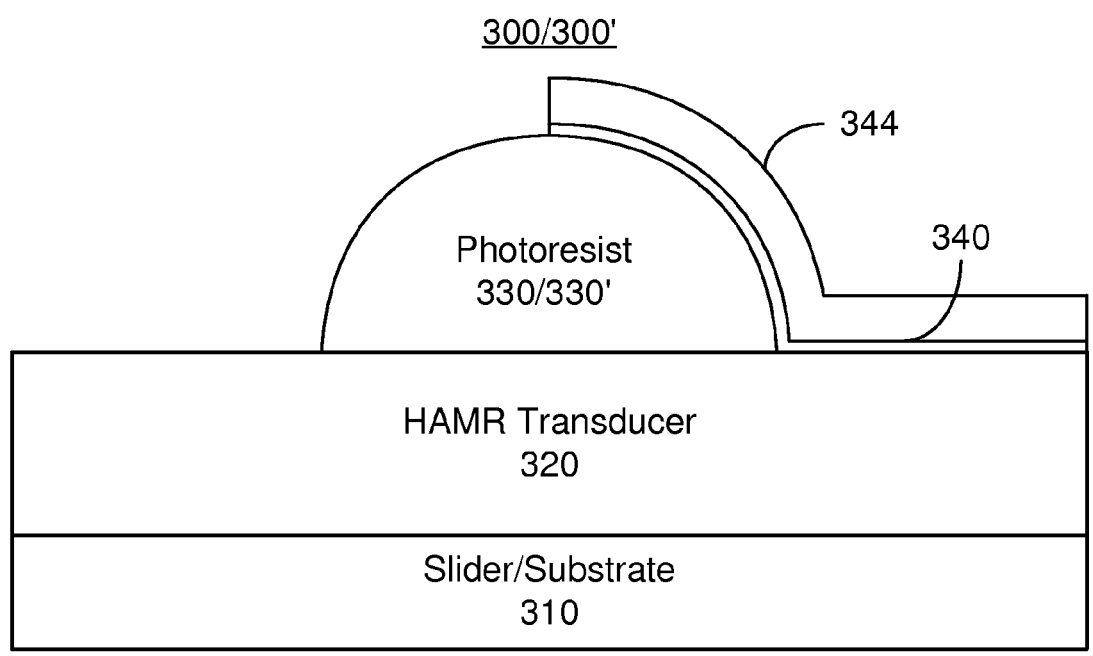
Figure 15:
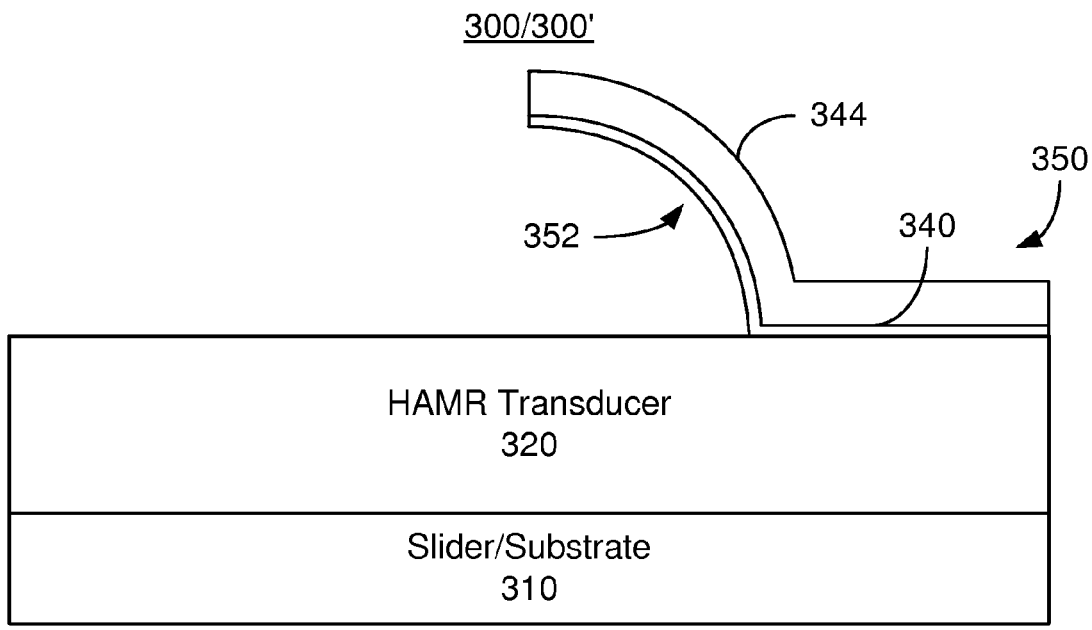
Figure 16:
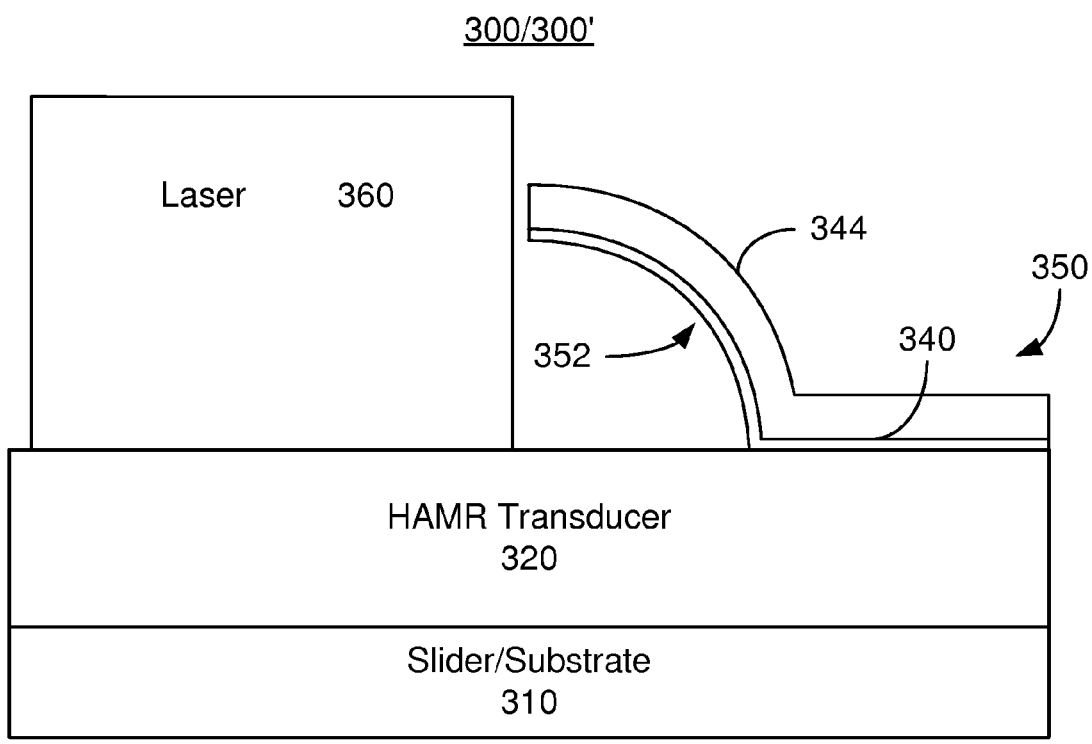
Figure 17:
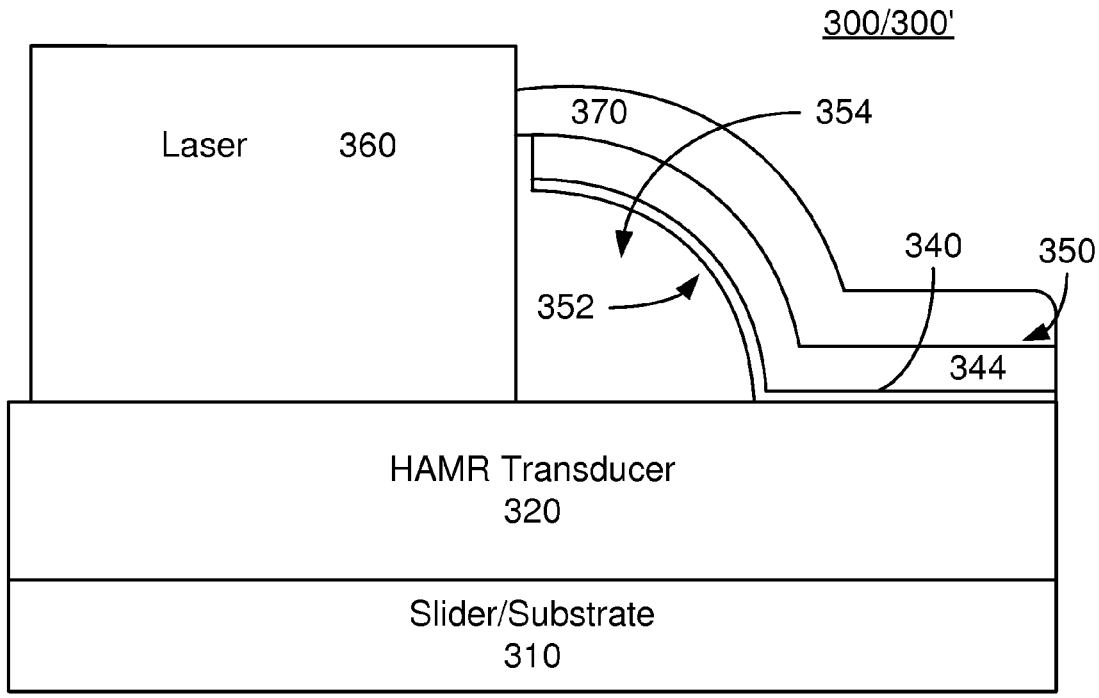

The exposed seed layer 340 and sacrificial structure 330/330' are removed, via step 234. The exposed seed layer 340 may be milled away. The sacrificial structure 330/330', which is formed of photoresist, may be stripped. FIG. 14 depicts the HAMR disk drive(s) 300/300' after the exposed portion of the seed layer 340 has been removed. Thus, the underlying sacrificial photoresist structure 330/330' is exposed. FIG. 15 depicts the HAMR disk drive(s) 300/300' after the sacrificial photoresist structure 330/330' has been removed. Thus, the free-standing reflector 350 is formed of the remaining portion of the seed layer 340 and the metal layer(s) 344. The concave reflective surface 352 is formed from the inner surface of the seed layer 340. Thus, the free-standing reflector 350 has been formed. To complete fabrication of the disk drive(s) 300/300' the laser is aligned to the reflector 350 and affixed as described above. FIG. 16 depicts the HAMR disk drive(s) 300/300' after a laser 360 has been aligned to the free-standing reflector 350 and affixed to the slider 310. An encapsulant may be provided as described above. For example, the encapsulant may be deposited on the metal layer(s) 344 at an angle from normal to the surface of the wafer. FIG. 17 depicts the disk drive(s) 300/300' after the encapsulant 370 has been provided. Thus, a sealed cavity 354 has been formed.

Using the method 220, therefore, the free-standing reflector 350 may be fabricated. Consequently, the benefit(s) of the HAMR disk drives 100, 100', 100', 100''' and/or 300/300' may be realized.

Figure 18:
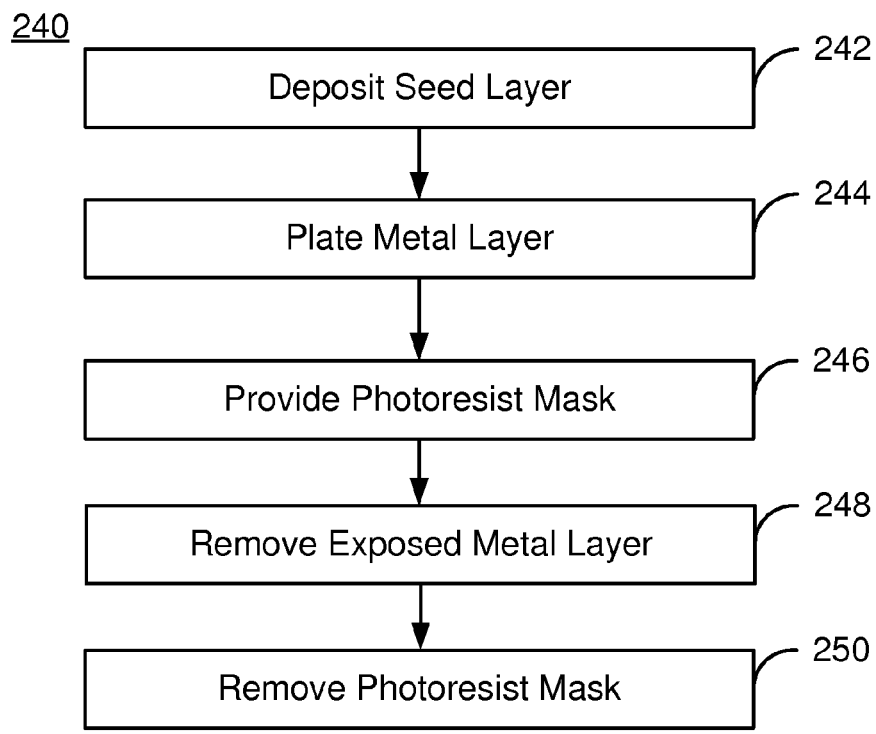
FIG. 18 is a flow chart depicting an exemplary embodiment of a method for fabricating a free-standing reflector for a HAMR write apparatus.

FIG. 18 is a flow chart depicting an exemplary embodiment of a method 240 for fabricating a free-standing reflector for a HAMR write apparatus. The method 240 may be used in fabricating free-standing reflectors 180/180' for disk drives such as the disk drives 100, 100', 100" and/or 100''', though other free-standing reflectors for other write apparatus might be so fabricated. For simplicity, some steps may be omitted, performed in another order, interleaved and/or combined. FIGS. 19-26 depict a portion of a HAMR write apparatus 300" during fabrication using the method 240. FIGS. 19-26 are not to scale and not all components of the disk drive 300" are shown. The HAMR disk drives being fabricated may include a write transducer and a read transducer (not shown) and resides on a slider. For simplicity, however, the read transducer is not discussed. The method 240 is also described in the context of forming a single HAMR disk drive 300". However, the method 240 may be used to fabricate multiple disk drives at substantially the same time. The method 240 and related system are also described in the context of particular layers. However, in some embodiments, such layers may include multiple sublayers. The method 240 also may commence after formation of other portions of the disk drive 300". For example, the method 240 may start after the HAMR transducer 320 on slider 310 has been completed. In addition, the method 240 starts after the photoresist sacrificial structure 330/330' has been formed. Note that the HAMR transducer 320 and slider 310 are analogous to the transducers 120, 120', 120" and 120'" and slider 110, respectively.

Figure 19:
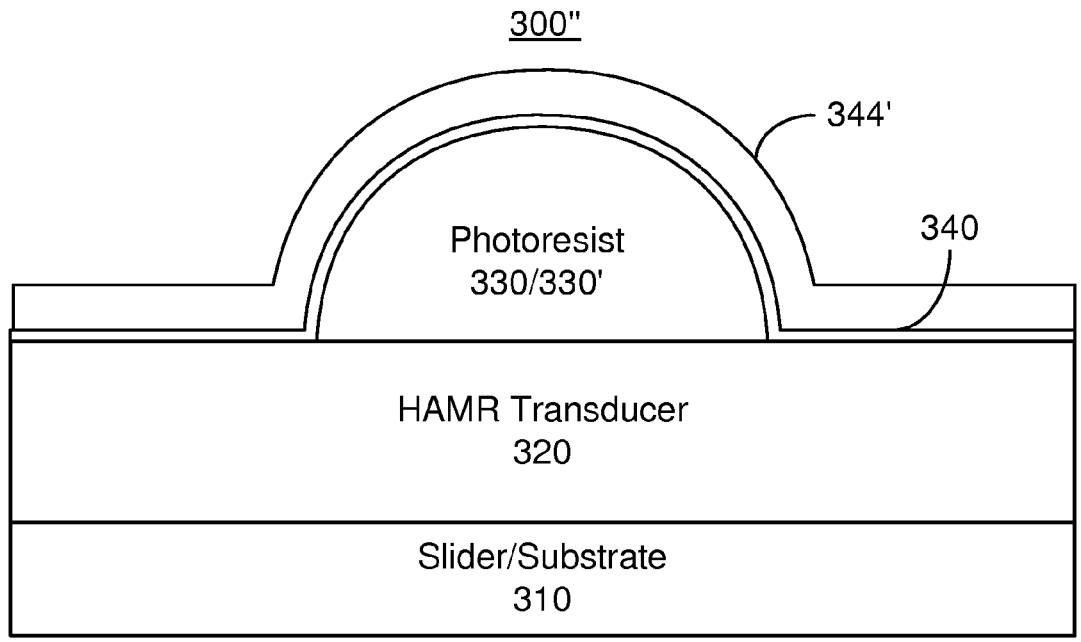
FIGS. 19-26 are side views of an exemplary embodiment of a HAMR write apparatus during fabrication.

A reflective seed layer that covers the sacrificial mask is deposited, via step 242. One or more metal layers are deposited, via step 244. This step may include plating the metal layer(s). The metal layers provided in step 244 may prevent corrosion and/or provide mechanical support for the portion reflective seed layer 340 that will function as a mirror. FIG. 19 depicts a side view of the HAMR disk drive 300" after step 242 is performed. Thus, reflective seed layer 340 and metal layer(s) 344' have been deposited.

Figure 20:
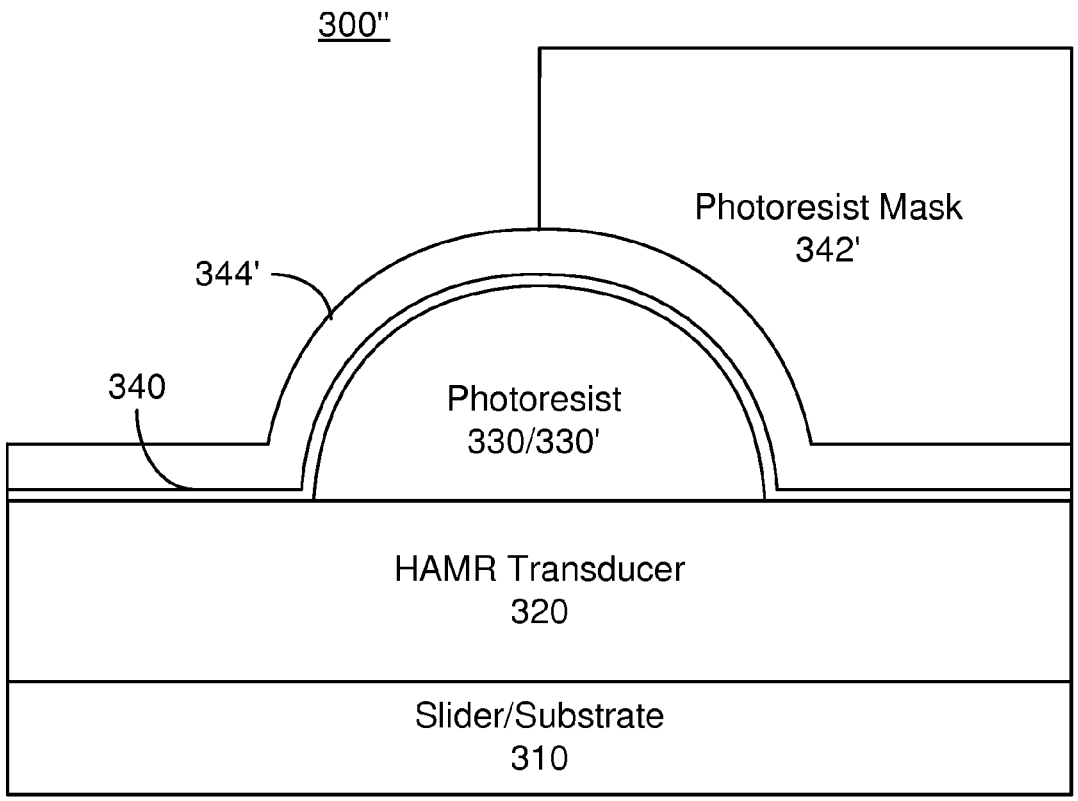

A mask that covers a portion of the sacrificial mask 330/330' is provided, via step 246. In some embodiments, step 246 includes fabricating a photoresist mask that covers the portion of the reflective seed layer 340 that is present in the final device. FIG. 20 depicts the HAMR disk drive 300" after step 246 is performed. Thus, photoresist mask 342' resides on a part of the metal layer 344'.

Figure 21:
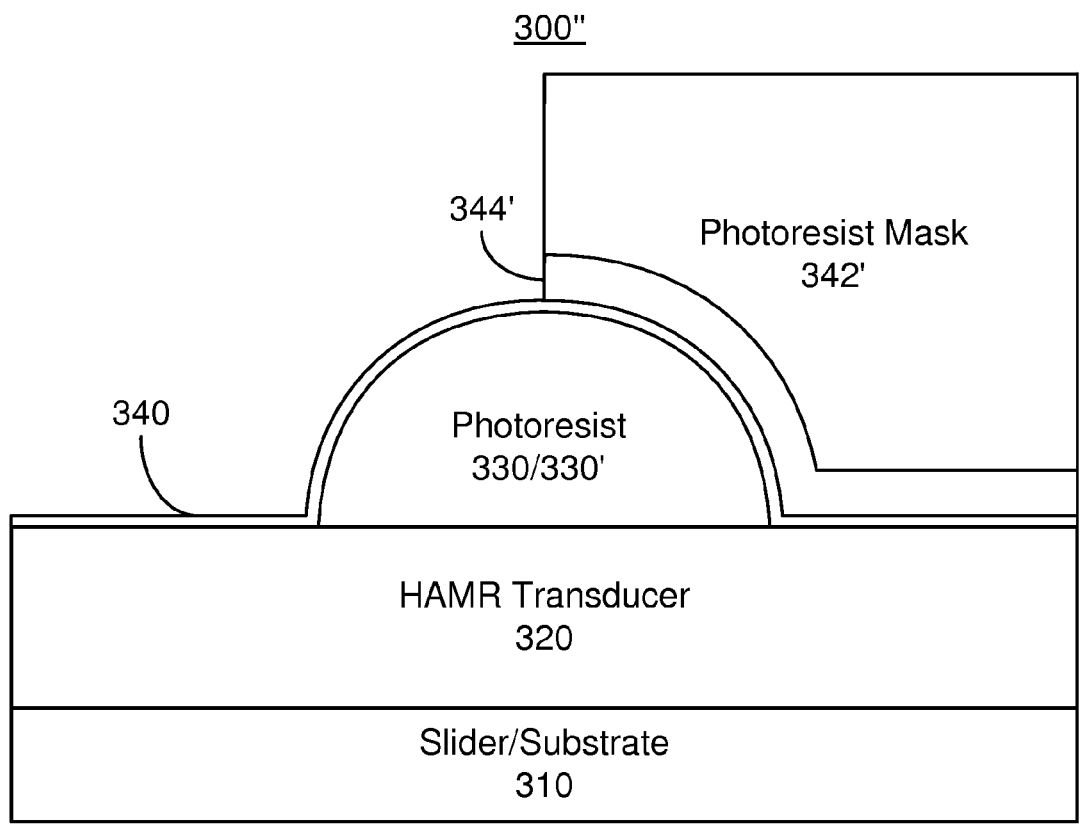

The exposed portion of the metal layer 344' is removed, via step 248. FIG. 21 depicts the HAMR disk drive 300" after step 248 is performed. Thus, only the metal layer 344' remaining is under the mask 342'.

Figure 22:
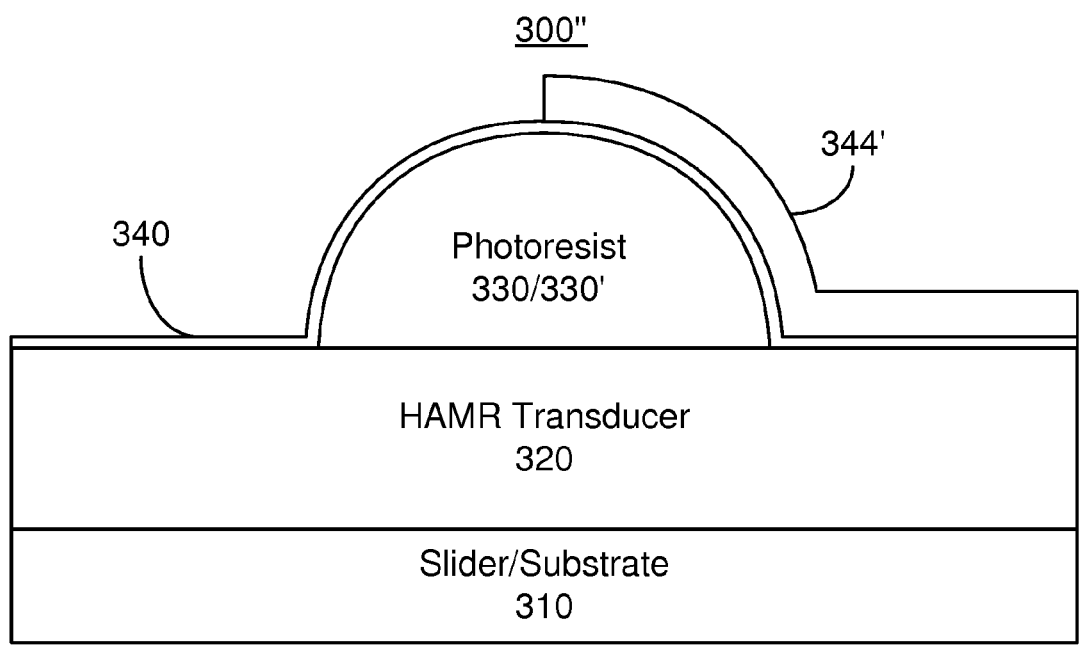

The photoresist mask 342' is removed, via step 250. Step 250 may include stripping the photoresist mask 342'. FIG. 22 depicts the HAMR disk drive 300" after removal of the mask. Thus, a portion of the seed layer 340 is covered by the metal layers 344', while another portion is exposed.

Figure 23:
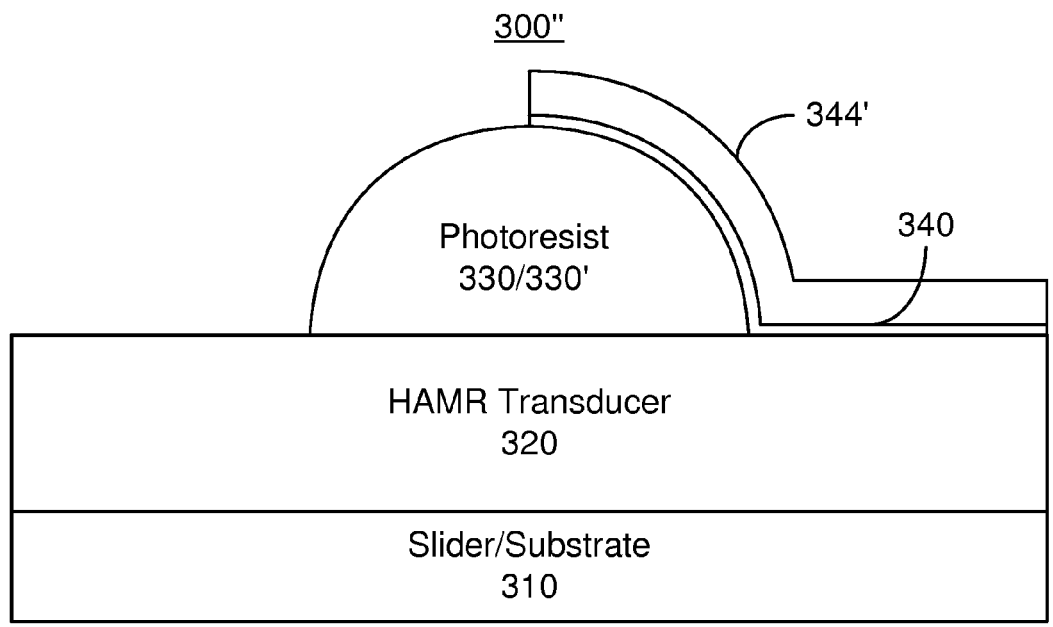
Figure 24:
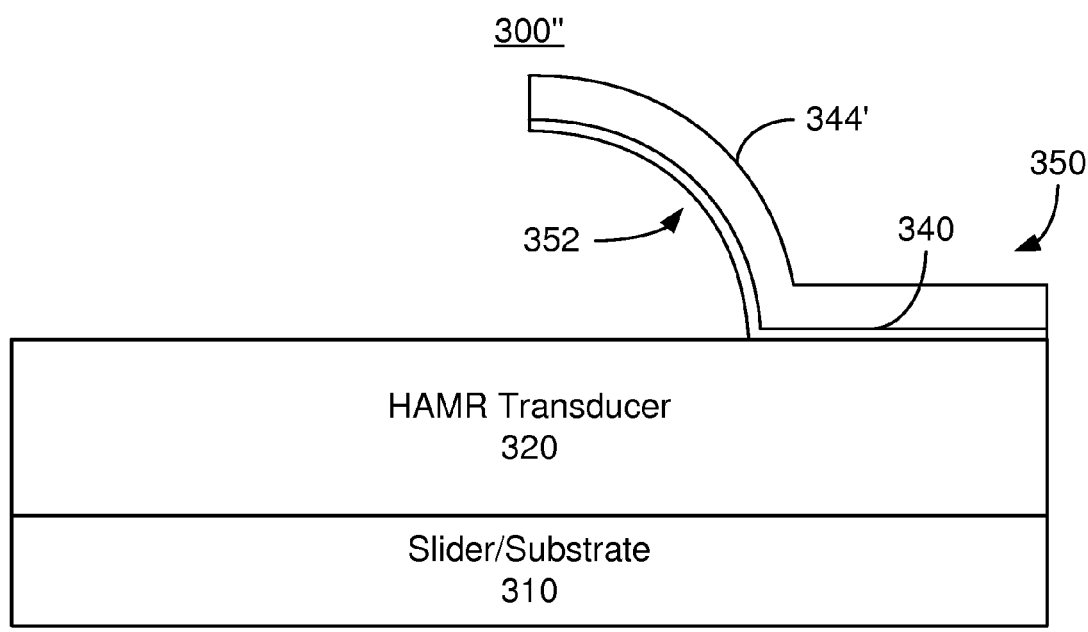
Figure 25:
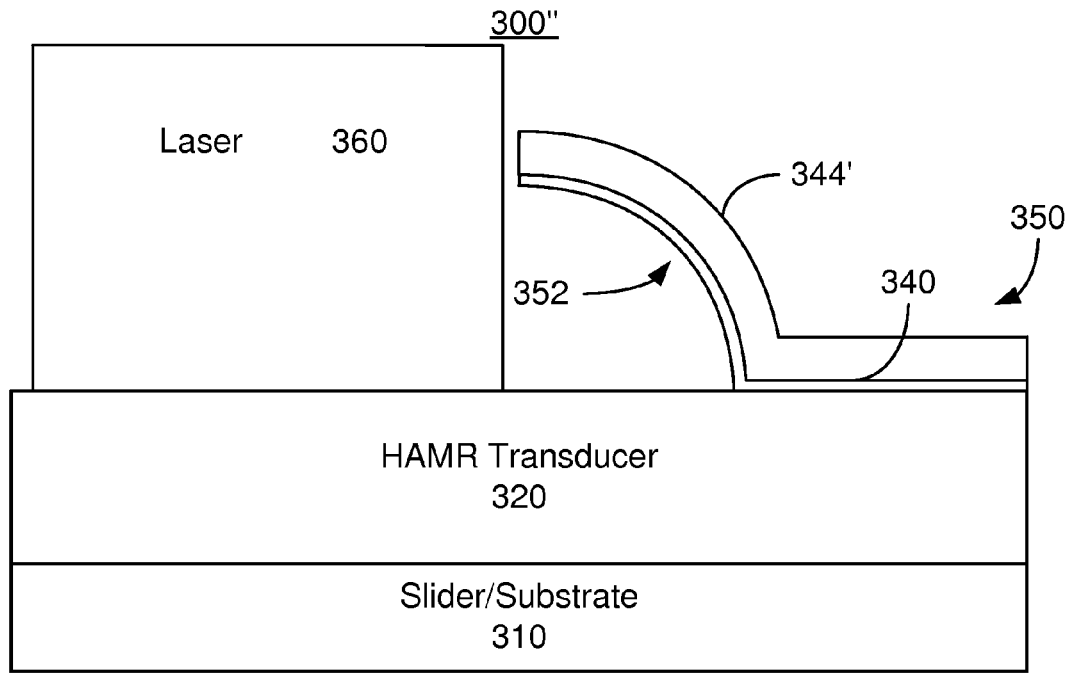
Figure 26:
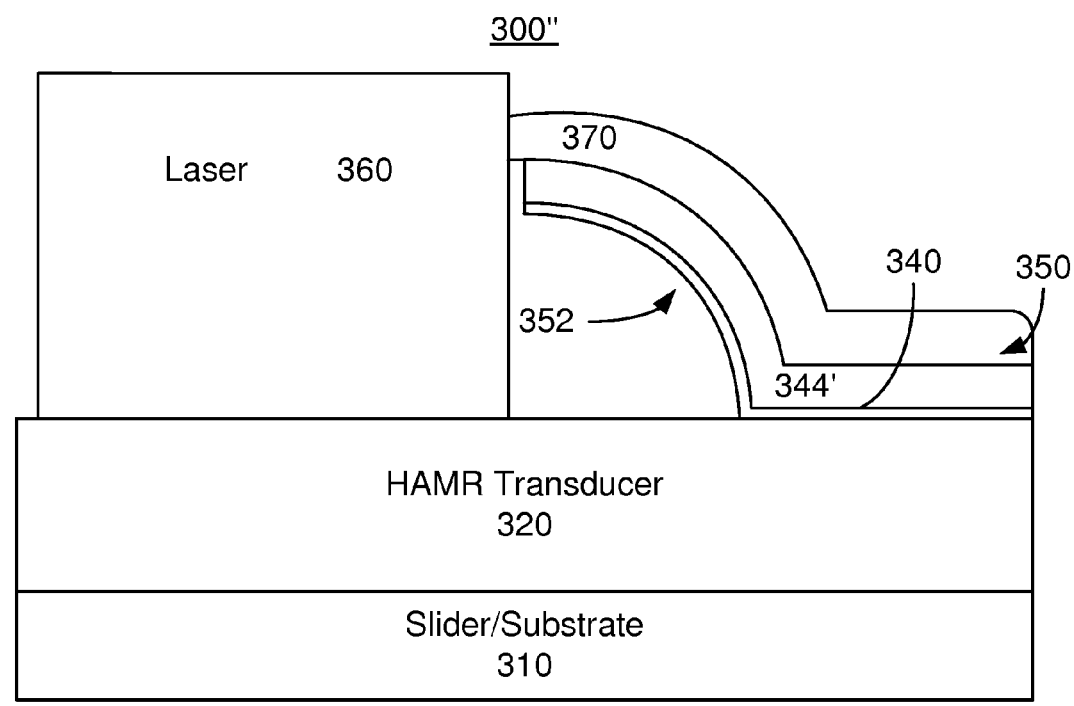

The remainder of fabrication of the HAMR disk drive 300" may be completed using the method 220 depicted in FIG. 7. Thus, the exposed seed layer 340 and sacrificial structure 330/330' are removed. The exposed seed layer 340 may be milled away. The sacrificial structure 330/330', which is formed of photoresist, may be stripped. FIG. 23 depicts the HAMR disk drive 300" after the exposed portion of the seed layer 340 has been removed. Thus, the underlying sacrificial photoresist structure 330/330' is exposed. FIG. 24 depicts the HAMR disk drive after the sacrificial structure 330/330' has been removed. Thus, the free-standing reflector 350 is formed of the remaining portion of the seed layer 340 and the metal layer(s) 344'. The concave reflective surface 352 is formed from the inner surface of the seed layer 340. Thus, the free-standing reflector 350 has been formed. To complete fabrication of the disk drive 300" the laser is aligned to the reflector 350 and affixed as described above. FIG. 25 depicts the HAMR disk drive 300" after the laser 360 has been provided. An encapsulant may be provided on the back surface of the metal layer(s) 344' as described above. For example, the encapsulant may be deposited at an angle. FIG. 26 depicts the disk drive 300" after the encapsulant 370 has been provided. Thus, a sealed cavity 354 has been formed.

Using the methods 220 and/or 240, the HAMR disk drives 300/300'/300" may be fabricated. The disk drives 300/300'/300" are analogous to the disk drives 100, 100', 100" and/or 100'". Performance and/or reliability of the disk drive 300/300'/300" may thus be improved in a manner analogous to the HAMR disk drives 100, 100', 100" and/or 100'".

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A heat assisted magnetic recording (HAMR) write apparatus coupled with a laser for providing energy, the HAMR write apparatus including a media-facing surface (MFS) and a laser-facing surface, the HAMR write apparatus comprising:
   a free-standing reflector residing on the laser-facing surface, the free-standing reflector having a concave reflective surface oriented to receive the energy from the laser;
   at least one waveguide optically coupled with the free-standing reflector and for directing energy from the laser toward the MFS; and
   at least one alignment control barrier between the laser-facing surface and the laser.

2. The HAMR write apparatus of claim 1 wherein the laser-facing surface is a trailing surface, the free-standing reflector and the laser residing on the trailing surface.

3. The HAMR write apparatus of claim 1 wherein the laser-facing surface is a top surface opposite to the MFS, the free-standing reflector and the laser residing on the top surface.

4. The HAMR write apparatus of claim 1 wherein the concave reflective surface is a spherical surface.

5. The HAMR write apparatus of claim 1 wherein the concave reflective surface is a parabolic surface.

6. The HAMR write apparatus of claim 1 wherein the free-standing reflector has a height measured from the laser-facing surface of not more than one hundred micrometers.

7. A heat assisted magnetic recording (HAMR) write apparatus coupled with a laser for providing energy, the HAMR write apparatus including a media-facing surface (MFS) and a laser-facing surface, the HAMR write apparatus comprising:
   a free-standing reflector residing on the laser-facing surface and being free of a solid enclosure adjoining the free-standing reflector, the free-standing reflector having a concave reflective surface oriented to receive the energy from the laser, the free-standing reflector having a back surface opposite to the concave reflective surface;
   an encapsulant residing on the back surface and a portion of the laser such that the concave reflective surface and a portion of the laser form an encapsulated cavity; and
   at least one waveguide optically coupled with the free-standing reflector and for directing energy from the laser toward the MFS.

8. A data storage device comprising:
   a media;
   a laser for providing energy;
   a slider having an air-bearing surface (ABS), a laser-facing surface, a heat assisted magnetic recording (HAMR) write transducer, and at least one alignment control barrier between the laser-facing surface and the laser, the HAMR write transducer including a main pole, at least one coil for energizing the main pole and a waveguide for directing energy from the laser toward the ABS; and
   a free-standing reflector residing on the laser-facing surface of the slider, the free-standing reflector having a concave reflective surface oriented to receive the energy from the laser, the free-standing reflector being optically coupled with the waveguide such that the energy from the laser is provided from the concave reflective surface to the waveguide.

9. The data storage device of claim 8 wherein the free-standing reflector has a back surface opposite to the concave reflective surface, the data storage device further comprising:
an encapsulant residing on the back surface and a portion of the laser such that the concave reflective surface and a portion of the laser form an encapsulated cavity.

10. A method for fabricating a heat assisted magnetic recording (HAMR) write apparatus coupled with a laser for providing energy, the HAMR write apparatus including a media-facing surface (MFS) and a laser-facing surface, the HAMR write apparatus further including a waveguide for directing energy from the laser toward MFS, the method comprising:
providing a free-standing reflector residing on the laser-facing surface and being free of a solid enclosure adjoining the free-standing reflector, the free-standing reflector having a concave reflective surface oriented to receive the energy from the laser and to provide the energy to the waveguide, the free standing reflector including a back surface opposite to the concave reflective surface;
aligning the laser to the free-standing reflector; and
providing an encapsulant residing on the back surface and a portion of the laser after the laser is aligned with the free-standing reflector, the encapsulant enclosing the concave reflective surface and a portion of the laser to form an encapsulated cavity.

11. The method of claim 10 wherein the laser-facing surface is a trailing surface, the free-standing reflector being provided on the trailing surface.

12. The method of claim 10 wherein the laser-facing surface is a top surface opposite to the MFS, the free-standing reflector and the laser residing on the top surface.

13. A method for fabricating a heat assisted magnetic recording (HAMR) write apparatus coupled with a laser for providing energy, the HAMR write apparatus including a media-facing surface (MFS) and a laser-facing surface, the HAMR write apparatus further including a waveguide for directing energy from the laser toward MFS, the method comprising:
providing a free-standing reflector residing on the laser-facing surface, the free-standing reflector having a concave reflective surface oriented to receive the energy from the laser and to provide the energy to the waveguide; and
aligning the laser to the free-standing reflector; wherein the step of providing the free-standing reflector further includes
providing a sacrificial mask on the laser-facing surface, the sacrificial mask having a convex portion corresponding to the concave reflective surface;
providing at least one reflective material on at least part of the convex portion of the sacrificial mask; and
removing the sacrificial mask.

14. The method of claim 13 wherein the step of providing the sacrificial mask further includes:
providing a photoresist structure having a physical dimension corresponding to a dimension of the convex portion of the sacrificial mask; and
heating the photoresist structure such that the photoresist structure reflows to form the sacrificial mask.

15. The method of claim 14 wherein the step of providing the at least one reflective material further includes:
depositing a reflective seed layer that covers at least the sacrificial mask; and
plating at least one metal layer.

16. The method of claim 15 wherein the step of providing the at least one reflective material further includes:
providing a mask covering a portion of the sacrificial mask after the step of depositing the seed layer and before the step of plating the at least one metal layer; and
removing the mask after the step of depositing the at least one metal layer.

17. The method of claim 15 wherein the step of providing the at least one reflective material further includes:
providing a mask covering a portion of the at least one metal layer after the step of plating the at least one metal layer;
removing an exposed portion of the at least one metal layer; and
removing the mask after the step of removing the exposed portion of the at least one metal layer.

18. A method for fabricating a heat assisted magnetic recording (HAMR) write apparatus coupled with a laser for providing energy, the HAMR write apparatus including a media-facing surface (MFS) and a laser-facing surface, the HAMR write apparatus further including a waveguide for directing energy from the laser toward MFS, the method comprising:
providing a free-standing reflector residing on the laser-facing surface, the free-standing reflector having a concave reflective surface oriented to receive the energy from the laser and to provide the energy to the waveguide, wherein the laser resides on the laser-facing surface;
aligning the laser to the free-standing reflector; and
providing at least one alignment control barrier between the laser-facing surface and the laser; and wherein the step of aligning the laser to the free-standing reflector further includes
using the free-standing reflector as a stopper in a first direction and using the at least one alignment control barrier as a stopper in at least a second direction different from the first direction.

* * * * *